(12) United States Patent
Shrivastava et al.

(10) Patent No.: US 12,389,258 B2
(45) Date of Patent: Aug. 12, 2025

(54) DETERMINATION OF WIRELESS COVERAGE FOR A MOBILE DEVICE USING A ROUTE BASED COVERAGE MAP

(71) Applicant: QUALCOMM Incorporated, San Diego, CA (US)

(72) Inventors: Avinash Shrivastava, Telangana State (IN); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 465 days.

(21) Appl. No.: 17/933,638

(22) Filed: Sep. 20, 2022

(65) Prior Publication Data

US 2024/0098537 A1    Mar. 21, 2024

(51) Int. Cl.
| | |
|---|---|
| H04W 24/10 | (2009.01) |
| G01C 21/00 | (2006.01) |
| G01C 21/36 | (2006.01) |
| H04W 4/029 | (2018.01) |
| H04W 16/26 | (2009.01) |

(52) U.S. Cl.
CPC ........ H04W 24/10 (2013.01); G01C 21/3697 (2013.01); G01C 21/3807 (2020.08); H04W 4/029 (2018.02); H04W 16/26 (2013.01)

(58) Field of Classification Search
None
See application file for complete search history.

(56) References Cited

U.S. PATENT DOCUMENTS

| | | | |
|---|---|---|---|
| 9,182,240 B2 * | 11/2015 | Poornachandran | .... G01C 21/16 |
| 9,565,625 B1 | 2/2017 | MacNeille et al. | |
| 10,101,432 B2 * | 10/2018 | Fechine | .................. B60Q 9/00 |
| 10,545,026 B1 * | 1/2020 | Schaefer | ........... G01C 21/3476 |
| 2019/0120629 A1 * | 4/2019 | Gum | ....................... H04W 4/02 |
| 2020/0205062 A1 * | 6/2020 | Azizi | ...................... H04W 4/46 |
| 2022/0046529 A1 | 2/2022 | Boerjesson et al. | |

OTHER PUBLICATIONS

International Search Report and Written Opinion—PCT/US2023/070905—ISA/EPO—Oct. 13, 2023.

* cited by examiner

*Primary Examiner* — Adolf Dsouza
(74) *Attorney, Agent, or Firm* — Thien T. Nguyen

(57) ABSTRACT

A server may obtain wireless network coverage information from crowdsourcing devices, where the wireless network coverage information indicates characteristics of wireless network coverage at different locations along various routes of travel. The server may determine a wireless coverage map of an area based on the wireless network coverage information, where the wireless coverage map comprises, for locations along one or more routes of travel within the area, a respective wireless coverage indication indicative of a level of wireless coverage for wireless networks at the respective location. The server may send route-based coverage information to a mobile device for a particular route, where the route-based coverage information includes the respective wireless coverage indication, from the coverage map, for one or more locations along the particular route.

30 Claims, 11 Drawing Sheets

DETERMINATION OF WIRELESS COVERAGE FOR A MOBILE DEVICE USING A ROUTE BASED COVERAGE MAP

BACKGROUND

1. Field of Disclosure

The present disclosure relates generally to the field of wireless communications, and more specifically to determining and utilizing wireless network coverage information along a route of travel.

2. Description of Related Art

Wireless mobile devices such as mobile phones and asset tracking devices often engage in wireless communications along a route of travel. For asset tracking, for example, asset tracking devices may periodically send reports of their location and other information to a remote monitoring device or server via a wireless communication network. To save power, these mobile devices often may disconnect from a wireless network and enter a low-power state (e.g., power saving mode, or PSM) between sending reports. To subsequently reconnect and send a report, they may first need to determine whether wireless coverage is available, and from which networks, which may take time and consume battery power.

BRIEF SUMMARY

An example method at a server of providing route-based coverage information, according to this disclosure, may comprise obtaining wireless network coverage information from a plurality of crowdsourcing devices, the wireless network coverage information indicating characteristics of wireless network coverage at a first plurality of locations, the first plurality of locations comprising locations along a plurality of routes of travel. The method also may comprise determining a wireless coverage map of an area based on the wireless network coverage information, wherein the wireless coverage map comprises, for each location of a second plurality of locations along one or more routes of travel within the area, a respective wireless coverage indication indicative of a level of wireless coverage of one or more wireless networks at the respective location. The method also may comprise sending route-based coverage information to a mobile device for a particular route of the one or more routes of travel, wherein the route-based coverage information includes the respective wireless coverage indication, from the coverage map, for one or more locations along the particular route.

An example method at a mobile device of using route-based coverage information, according to this disclosure, may comprise receiving, from a server, route-based coverage information for a particular route of travel, wherein the route-based coverage information includes, for each location of a plurality of locations along the particular route, a respective coverage indication indicative of a level of wireless coverage of one or more wireless networks at the respective location. The method also may comprise determining a communication schedule for wirelessly communicating with a remote device while traveling along the particular route, wherein determining the communication schedule is based at least in part on: an estimated location of the mobile device, and the route-based coverage information for the particular route.

An example server comprising: a transceiver, a memory, one or more processors communicatively coupled with the transceiver and the memory, wherein the one or more processors are configured to obtain wireless network coverage information via the transceiver from a plurality of crowdsourcing devices, the wireless network coverage information indicating characteristics of wireless network coverage at a first plurality of locations, the first plurality of locations comprising locations along a plurality of routes of travel. The one or more processors further may be configured to determine a wireless coverage map of an area based on the wireless network coverage information, wherein the wireless coverage map comprises, for each location of a second plurality of locations along one or more routes of travel within the area, a respective wireless coverage indication indicative of a level of wireless coverage of one or more wireless networks at the respective location. The one or more processors further may be configured to send route-based coverage information via the transceiver to a mobile device for a particular route of the one or more routes of travel, wherein the route-based coverage information includes the respective wireless coverage indication, from the coverage map, for one or more locations along the particular route.

An example mobile device comprising: a transceiver, a memory, one or more processors communicatively coupled with the transceiver and the memory, wherein the one or more processors are configured to receive, via the transceiver from a server, route-based coverage information for a particular route of travel, wherein the route-based coverage information includes, for each location of a plurality of locations along the particular route, a respective coverage indication indicative of a level of wireless coverage of one or more wireless networks at the respective location. The one or more processors further may be configured to determine a communication schedule for wirelessly communicating with a remote device while traveling along the particular route, wherein determining the communication schedule is based at least in part on: an estimated location of the mobile device, and the route-based coverage information for the particular route.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Like reference symbols in the various drawings indicate like elements, in accordance with certain example implementations.

DETAILED DESCRIPTION

Figure 1:
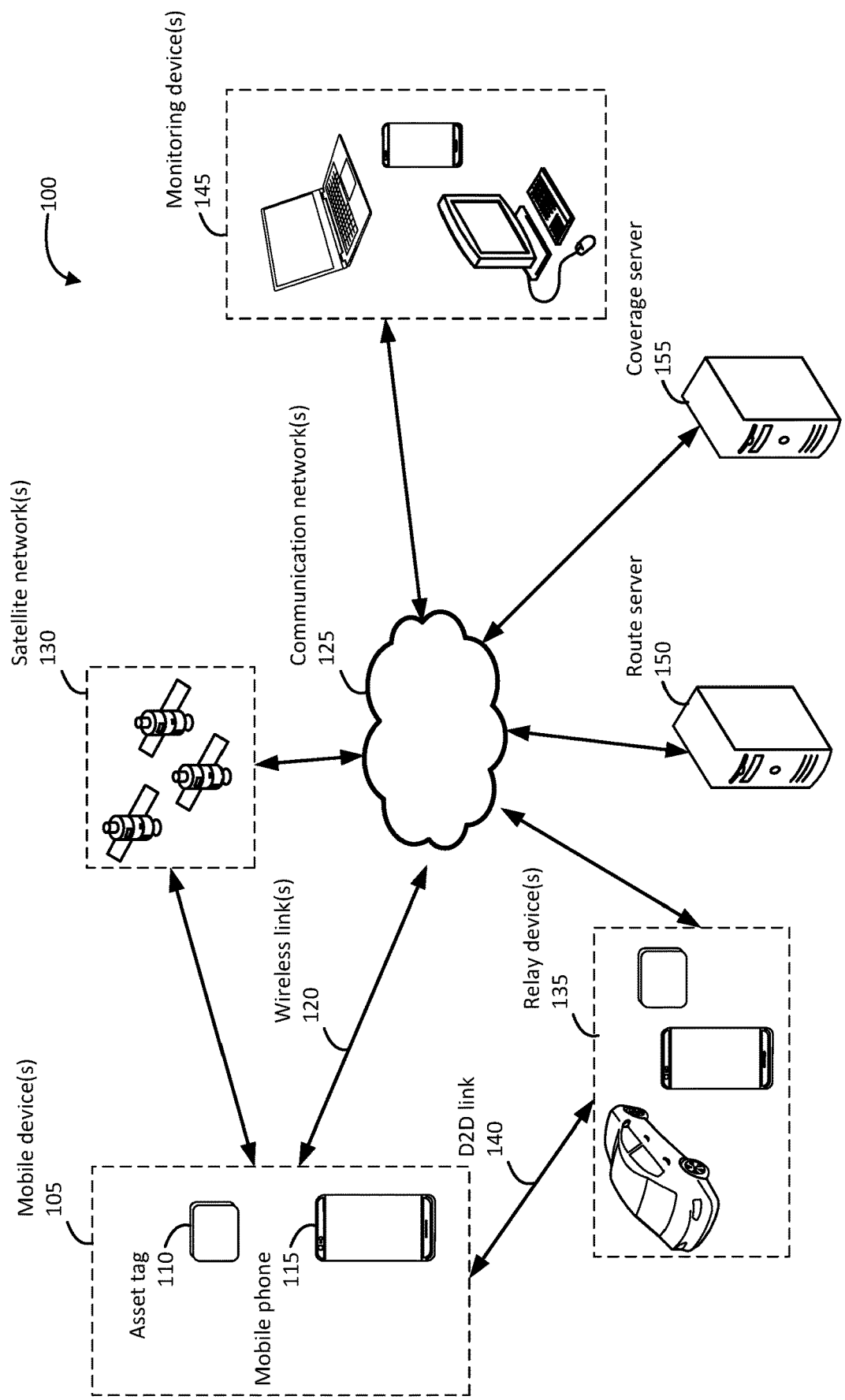
FIG. 1 is a diagram of a system enabling the creation and use of route-based coverage maps, according to an embodiment.

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology. More particularly, although embodiments described herein often refer to determining wireless coverage of a wireless wide area network (WWAN), such as a cellular network, embodiments may apply to additional or alternative wireless networks.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

As noted, wireless mobile devices may engage in communications using one or more wireless networks while traveling along a route. To do so, such wireless mobile devices often may need to perform a scan to detect whether wireless coverage is available via one or more wireless networks. A mobile device may listen, for example, for broadcast signals transmitted by base stations of a cellular network. But this process of scanning can take time and consume battery power, which can be extremely limited for many wireless mobile devices. For example, if no wireless coverage is available from any usable network at the current location of a mobile device, scanning for broadcast signals could take substantial time (e.g. 10 to 30 seconds), resulting in significant battery power consumption and would not in the end allow any communication by the mobile device. Knowing in advance whether wireless coverage was available could then be a benefit, as a mobile device would then not need to scan for wireless coverage when it was known that no wireless coverage was available.

Embodiments herein address these and other issues by creating a route-based coverage map that can be used by wireless mobile devices to determine coverage of one or more wireless networks while traveling along a route. The coverage map for the route may be based on data of an area gathered by crowdsourcing information from wireless devices within the area. Once provided with the route-based coverage map, a mobile device can then determine a schedule of when, where, and/or how to communicate along the route. Embodiments may be implemented using any of a variety of different components. An example system is provided in FIG. 1.

FIG. 1 is a diagram of a system 100 enabling the creation and use of route-based coverage maps, according to an embodiment. As with other figures provided herein, FIG. 1 is provided as a non-limiting example, and alternative embodiments may have additional or alternative components and/or the various components may be connected in different ways. In FIG. 1, arrows represent communication links, which may include wired and/or wireless communications that may be governed by different standards and/or protocols. It will be further understood that FIG. 1 is a simplified diagram. The various components, networks, and communication links may include additional devices that are not shown, and the number and/or type of devices shown in FIG. 1 are not intended to be exhaustive or limiting. The illustrated communication links that connect the various components in the system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality.

In the system 100, mobile device(s) 105 may comprise wireless mobile devices capable of communicating via one or more wireless networks. Examples of such mobile devices 105 comprise asset tag 110 and mobile phone 115. Additional types of mobile devices 105 (not shown) may include, for example a laptop, tablet, personal data assistant (PDA), navigation device, Internet of Things (IoT) device, wearable device, In Vehicle communications System (IVS), or some other portable or moveable device with wireless communication capabilities. Depending on desired functionality, the mobile device(s) 105 may support wireless communication using one or more Radio Access Technologies (RATs) such as using GSM, CDMA, W-CDMA, Long Term Evolution (LTE), High Rate Packet Data (HRPD), IEEE 802.11 Wi-Fi®, Bluetooth, Worldwide Interoperability for Microwave Access (WiMAX™), 5G New Radio (NR), etc. The mobile device(s) 105 may also support wireless communication using a Wireless Local Area Network (WLAN) which (like the one or more RATs) may connect to other networks, such as the Internet. The use of wireless communications can enable the mobile device(s) 105 to communicate (e.g., via wireless link(s) 120) with other components of the system 100 via the communication network(s) 125.

Depending on desired functionality, the communication network(s) 125 may comprise any of a variety of wireless and/or wireline networks, including the wireless network(s) accessible by the mobile device(s) 105 via the wireless link(s) 120, for which wireless coverage information can be used for the creation and use of route-based coverage maps (as discussed in more detail hereafter). The communication network(s) 125 can, for example, comprise any combination of public and/or private networks, local and/or wide-area networks, and the like. Furthermore, the communication network(s) 125 may utilize one or more wired and/or wireless communication technologies. In some embodiments, the communication network(s) 125 may comprise a cellular or other mobile network, a wireless local area network (WLAN), a wireless wide-area network (WWAN), and/or the Internet, for example. Examples of communication network(s) 125 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Communication network(s) 125 may also include more than one type of network.

According to some embodiments, the mobile device(s) 105 may be capable of communicating with the communication network(s) 125 via one or more satellite networks 130, which may also be referred to as satellites 130. According to some embodiments, satellite network(s) 130 may comprise a satellite-based communication network having satellites (also known as space vehicles (SVs)) capable of communicating with terrestrial devices, including mobile device(s) 105. Satellites in the satellite network(s) 130 may comprise, for example, a constellation of low-Earth orbit (LEO), medium-Earth orbit (MEO) and/or geostationary-Earth orbit (GEO) satellites communicatively coupled with one or more terrestrial networks (e.g., communication network(s) 125). Satellite network(s) 130 may be referred to as non-terrestrial networks (NTNs), and, according to some embodiments, satellites of the satellite network(s) 130 may functionally support and operate non-terrestrial transmission reception points (TRPs) (also known as transmit/receive points) of a WWAN network (e.g., LTE and/or NR network). Satellites 130 used for communication may be different than satellites used for Global Navigation Satellite System (GNSS) positioning (which may be accessed by the mobile device(s) 105 as described elsewhere herein).

According to some embodiments, the mobile device(s) 105 may be capable of communicating with the communication network(s) 125 via one or more relay device(s) 135. As illustrated, relay device(s) 135 may comprise mobile devices such as cars, IVS s, cell phones, asset tags, etc., which can include the same types of devices as mobile device(s) 105, or may be different. Mobile device(s) 105 may communicate with relay device(s) 135 via a device-to-device (D2D) link 140, such as Proximity Services (ProSe) or sidelink. The D2D link 140 may employ sidelink signaling and can relay communications between the mobile device(s) 105 and communication network(s) 125 via a relay device 135. That is, if a mobile device 105 is outside a wireless coverage area of the communication network(s) 125 but within wireless communication range of one or more relay device(s) 135 that are inside the wireless coverage area, the one or more relay device(s) 135 can effectively extend the wireless coverage area of the communication network(s) 125 to the mobile device 105 via the D2D link 140. In some scenarios, multiple relay devices 135 may form a communication chain such that communications between the mobile device(s) 105 and communication network(s) 125 may pass through multiple relay devices 135. In an alternative embodiment, a relay device 135 may contain base station functions and may be seen by a mobile device 105 as a base station of a communication network 125, in which case, relaying may occur via the relay 135 and a link 140 that uses uplink/downlink signaling instead of sidelink signaling.

Monitoring device(s) 145 may comprise one or more devices remote from the mobile device(s) 105 with which the mobile devices 105 communicate. Monitoring device(s) 145 may be used by an individual, company, agency, other entity, or a combination thereof, to monitor and/or manage mobile device(s) 105, and may comprise one or more servers, laptops, PCs, mobile devices, specialized hardware, or the like. In an application such as asset tracking, for example, mobile device(s) 105 may comprise one or more asset tags 110 that periodically communicate their location to monitoring device(s) 145. The monitoring device(s) 145 may comprise a server that gathers this information, which may be accessible via a portal or application, executed by a computer or mobile device, that indicates to users (e.g., via a display) the location of the one or more asset tags 110. Monitoring device(s) 145 may also gather statistical information regarding the asset tags 110 for data analysis, logistical optimization, etc.

Route server 150 may comprise a computer server accessible to mobile device(s) 105 that provides the mobile device(s) 105 with a route of travel. In some embodiments, the route server 150 may simply use map information to determine the route based on an origin and destination. In some embodiments, the origin and destination may be provided by the mobile device(s) 105, in which case the route server 150 can then provide the route for the mobile device(s) 105 to take. In some embodiments, the origin and destination may be provided by another device (e.g., a monitoring device 145, a vehicle transporting the mobile device(s) 105, etc.). In some embodiments, the route server 150 may perform higher-level logistical management of the mobile device(s) 105, in which case it may determine the origin and destination. This may be the case, for example, if the route server 150 manages routing for a parcel delivery service, which may optimize route determination for a fleet of vehicles. Routes may be determined based on factors such as fuel efficiency, current traffic conditions, other road conditions, weather, vehicle range and/or other capabilities, or any combination thereof. According to some embodiments, the route server 150 may determine a route for a vehicle transporting the mobile device(s) 105, and may then provide route information to the vehicle and the mobile device(s) 105. In some embodiments, a vehicle may provide the mobile device(s) 105 with route information, which the vehicle may receive from the route server 150. In some embodiments, the route server 150 may provide the route to the coverage server 155, which may then determine coverage information based on the route and provide the route and coverage information to the mobile device(s) 105.

Coverage server 155 may comprise a computer server accessible to the mobile device(s) 105 that receives crowd-sourcing information from the mobile device(s) 105 and/or provides route-based coverage information to the mobile device(s) 105. In brief, the coverage server 155 can receive information regarding wireless coverage characteristics from the mobile device(s) 105 to create a route-based coverage map of an area. A route-based coverage map of an area is a map that indicates roads (or at least main roads) in a particular area along with a coverage level at various locations along each road on the map. Once the route-based coverage map is developed, the coverage server 155 can then provide coverage information to mobile device(s) 105 regarding an intended route of travel (which may comprise the same or different mobile device(s) 105 than those that provided crowdsourcing information used to create the map). With this coverage information, mobile device(s) 105 can then determine a plan (or schedule) for communicating along the route that can help maximize efficiency, battery life, etc.

Figure 2:
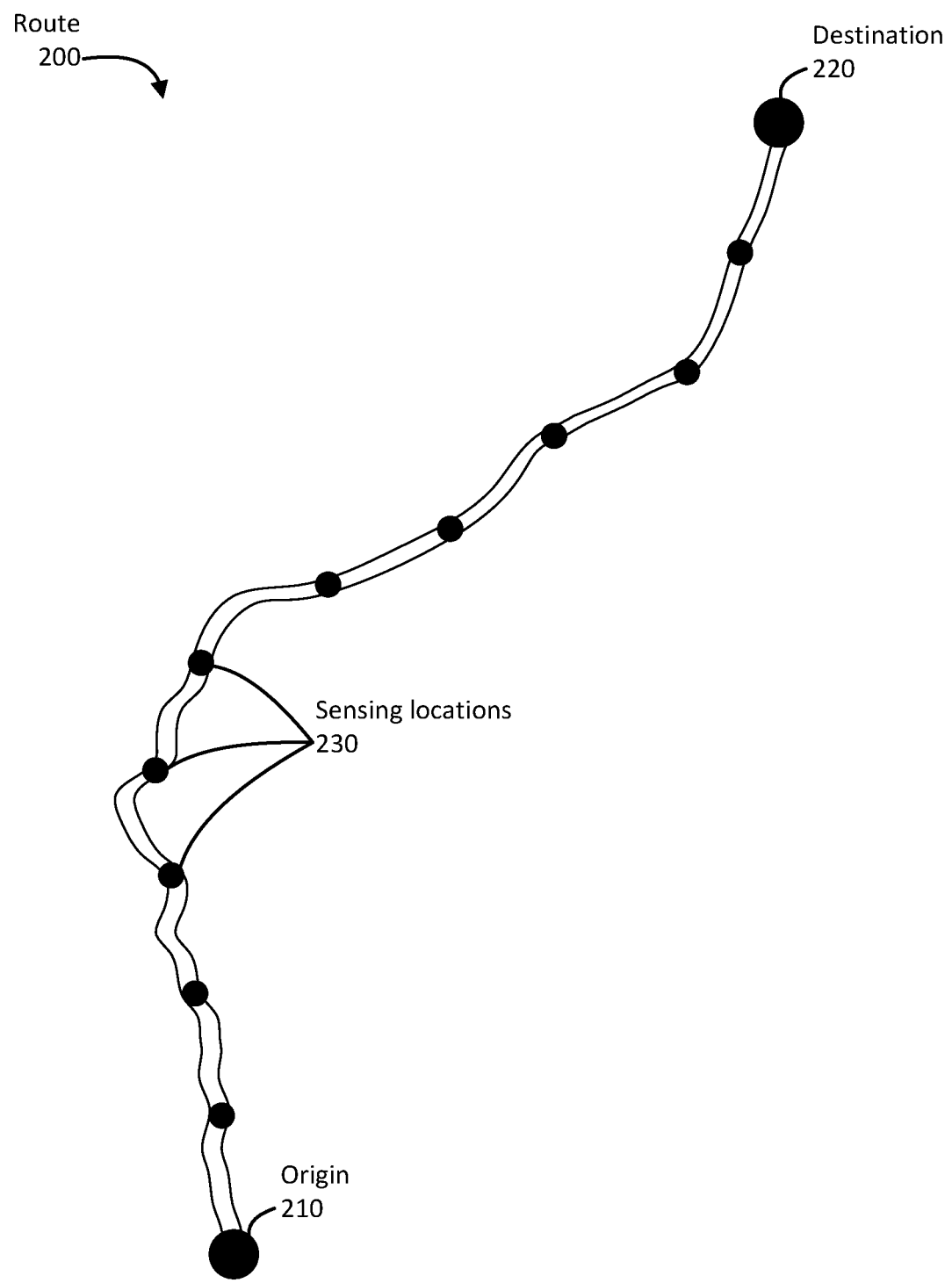
FIG. 2 is a simplified overhead view of an example route.

FIG. 2 is a simplified overhead view of an example route 200, illustrating how crowdsourcing information may be obtained from a mobile device (e.g., one of the mobile device(s) 105 in FIG. 1), according to some embodiments. In this example, a mobile device travels along the route 200 from an origin 210 to a destination 220. As the mobile device travels along the route 200, it can send information regarding coverage (and optionally other information) to a server (e.g., the coverage server 155 of FIG. 1) or another remote device for creating a route-based coverage map.

Coverage information may be gathered at various sensing locations 230 along the route 200. (To avoid clutter, only a few of the sensing locations 230 have been labeled in FIG. 2.) Depending on desired functionality, the locations of the sensing locations 230 may be determined by the mobile device, or by a server, which may provide the mobile device with information regarding collecting data prior to the mobile devices travel along the route 200. For example, the server may determine particular locations along the route 200 for which it has insufficient coverage information, and may configure the mobile device to gather coverage information at those particular locations. Additionally or alternatively, the sensing locations 230 may be determined by the mobile device or server before and/or during the mobile devices travel along the route 200 based on a periodicity of time and/or distance (e.g., every X minutes and/or every Y meters or Y kilometers), a predetermined schedule, predetermined locations (e.g., at the beginning, middle, or end of predetermined road segments), a trigger condition (e.g., sensing a change in coverage, speed, elevation, temperature, etc., or a combination thereof, beyond a threshold), or a combination thereof.

At each of the sensing locations 230, the mobile device may determine coverage information for one or more wireless networks. To do so, the mobile device may perform a scan of RF signals to determine whether wireless coverage is or is not available and/or may measure signal strength/power levels for one or more wireless networks for which wireless coverage is available. According to some embodiments, a mobile device gathering coverage information for multiple wireless networks may perform sensing for all of the wireless networks at each sensing location 230, or may perform sensing for only some wireless networks—e.g. the same or different wireless networks at different sensing locations 230.

Depending on desired functionality, other information also may be gathered at each of the sensing locations 230 and provided to a server along with coverage information. This other information may include any of a variety of types of information that could be used by other mobile devices subsequently traveling along the route 200, and may be dependent on the types of sensors a mobile device has that are capable of obtaining this other information. The other information can include, but is not limited to, traffic levels, availability (e.g. numbers) of nearby relay devices 135, temperature, speed of the mobile device and/or speeds or speed information for other vehicles nearby to the mobile device, or any combination thereof. In some embodiments, a number of available nearby relay devices 135 may be reported, which could potentially be used to indicate whether, at a given sensing location 230, connection to a wireless network may be available via a relay device 135 if coverage is not otherwise available.

The way in which a mobile device reports coverage information to a server may vary, depending on desired functionality. If wireless coverage is available along the route 200, the mobile device may send a report to the server at each of the sensing locations 230. If wireless coverage becomes unavailable at any of the sensing locations 230, the mobile device may store the information and provide it to the server at a later point in time, when coverage is again available. According to some embodiments, the mobile device may store all of the information obtained at each of the sensing locations 230 and send the information to the server in a single batch after arriving at the destination 220.

The coverage information included in a report sent to the server may also vary. The coverage information can include, for each of the sensing locations 230, whether coverage is available (e.g., a binary "yes" or "no"), an indication of how good the coverage might be (e.g., based on signal power levels detected at the sensing locations 230), which wireless networks are detected, or a combination thereof. For each sensing location 230, reported coverage information may be accompanied by a timestamp of when coverage information for the respective sensing location 230 was obtained and the location of the respective sensing location 230. Location information for a mobile device may be obtained by the mobile device using GNSS and/or inertial and other sensors (e.g., odometer, accelerometer(s), magnetometer, barometer). The location information may include absolute coordinates (e.g. latitude, longitude and optionally altitude) and/or relative location information (e.g., a location along a road such as a mile marker and/or a position relative to a reference point on the route 200 where the position may be defined as either a distance travelled along the route 200 between the position and the reference point or a straight line distance between the position and the reference point). Further, as previously noted, information reported by the mobile device can include information in addition to coverage information, such as temperature, speed, relay devices, etc.

Because crowdsourcing information may not be limited to a single mobile device, embodiments may coordinate crowdsourcing in an efficient manner. Such coordination can be orchestrated by a coverage server (e.g., coverage server 155 of FIG. 1) or other device, including among mobile devices themselves. Further, the coordination of such crowdsourcing may take into account capabilities of mobile devices. As an example, crowdsourcing coordination among multiple asset tracking devices may take into account battery capabilities of each asset tracking device. If a first asset tracking device has only three hours of battery capability left, but a route takes six hours to complete, the first asset tracking device may obtain coverage (and optionally other) information for the first half of the route, and a second device (on the same vehicle, or on a separate vehicle traveling the same route) may obtain coverage information for the second half of the route. If these asset tracking devices are within communication range of each other, they may coordinate with each other. For example, after obtaining coverage information for the first half of the route, the first asset tracking device may communicate with a second asset tracking device (which may not have been obtaining coverage information) to configure the second asset tracking device to obtain coverage information for the second half of the route. According to some embodiments, the first asset tracking device may select the second asset tracking device (e.g., from a plurality of additional asset tracking devices) based on battery capabilities. That is, the second asset tracking device may be selected if it has higher battery capacity and/or capabilities than other asset tracking devices and/or sufficient battery capabilities for obtaining coverage information for the second half of the route. Determining battery capabilities among mobile devices and/or with a server may be based on a current power profile provided by mobile devices. According to some embodiments, a first mobile device configured to obtain coverage information for a route may decide to transfer the task of obtaining coverage information for the route base, for example, on a percentage of battery life dropping below a threshold level, a determination that remaining battery will be insufficient to obtain coverage information for the route (or the remainder of route, or a period of time until the device reaches a known charging location), and/or other factors.

Figure 3:
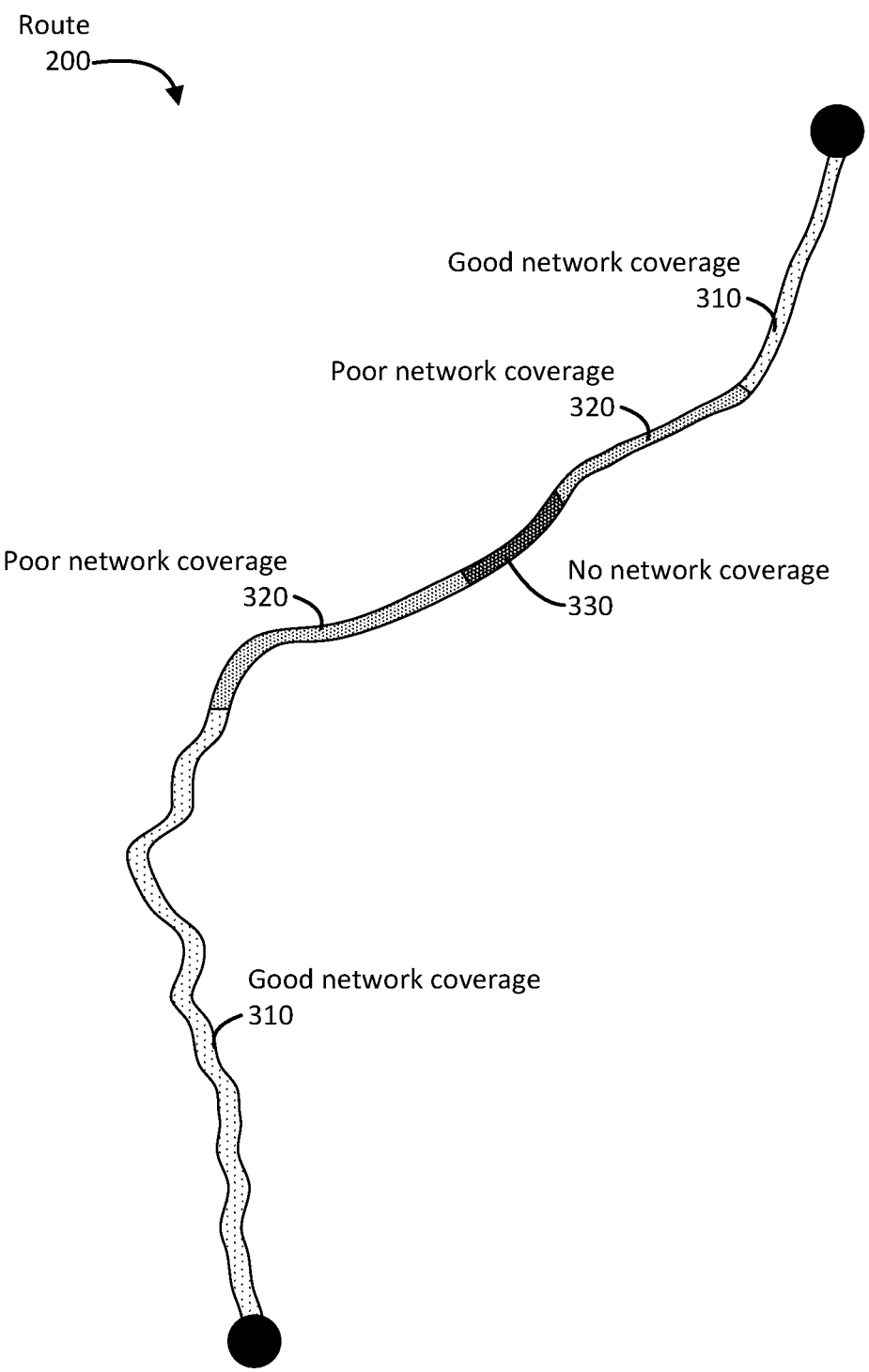
FIG. 3 is an illustration of example coverage information for the route of FIG. 2.

FIG. 3 is an illustration of coverage information for the route 200 that can be compiled by a server that receives crowdsourcing information from mobile devices that travel along the route 200. Over time, as mobile devices continue to provide the server with coverage information along the route 200, the server can determine network coverage along the route 200. The fidelity and integrity of this information can increase with each report received from a mobile device. As noted, the server may identify certain locations along the route 200 for which additional coverage information may be desired, in which case it may indicate to mobile devices (e.g., prior to the mobile devices traveling along the route 200) to gather coverage information at the certain locations.

In this example, the route 200 is divided into various road segments based on coverage. As illustrated, the route 200 comprises segments having good network coverage 310, poor network coverage 320, and no network coverage 330. Alternative embodiments may convey similar information differently. For example, according to some embodiments, a route 200 or road may be segmented into segments of a predetermined length (e.g., segments of X meters or kilometers), where each segment has its own coverage information. Additionally or alternatively, the type of coverage information provided may vary (e.g., a binary "yes" or "no", signal strength, available networks etc.), based on information received by the server from crowdsourcing mobile devices. Further, coverage information as shown in FIG. 3 may be provided for each of a plurality of wireless networks and/or coverage information regarding each network may be provided for each segment. For example, some embodiments may indicate that segments having good network coverage 310 include coverage from wireless networks A and B, whereas segments having poor network coverage 320 have coverage from wireless network B only, or the like.

The coverage information that is compiled by the server as illustrated in FIG. 3 may be time based, in which case a particular time (e.g. time of day and/or day of week) or a particular period of time (e.g. 7:00 am to 6:00 pm, midnight to 7:00 am, Monday to Friday, Saturday and Sunday etc.) may be included with other coverage information for each segment or location along the route 200. The extra time based information may be useful when coverage information for a route such as route 200 is subject to change at different times and on different days (e.g. daytime versus nighttime or weekday versus weekends). For example, some networks may reduce coverage along certain routes when traffic is low to conserve power (e.g. at nighttime or weekends) and may increase coverage when traffic is higher (e.g. in daytime or on weekdays). Similarly, other types of coverage information such as availability of relays may also be subject to variation depending on time and/or day.

Figure 4:
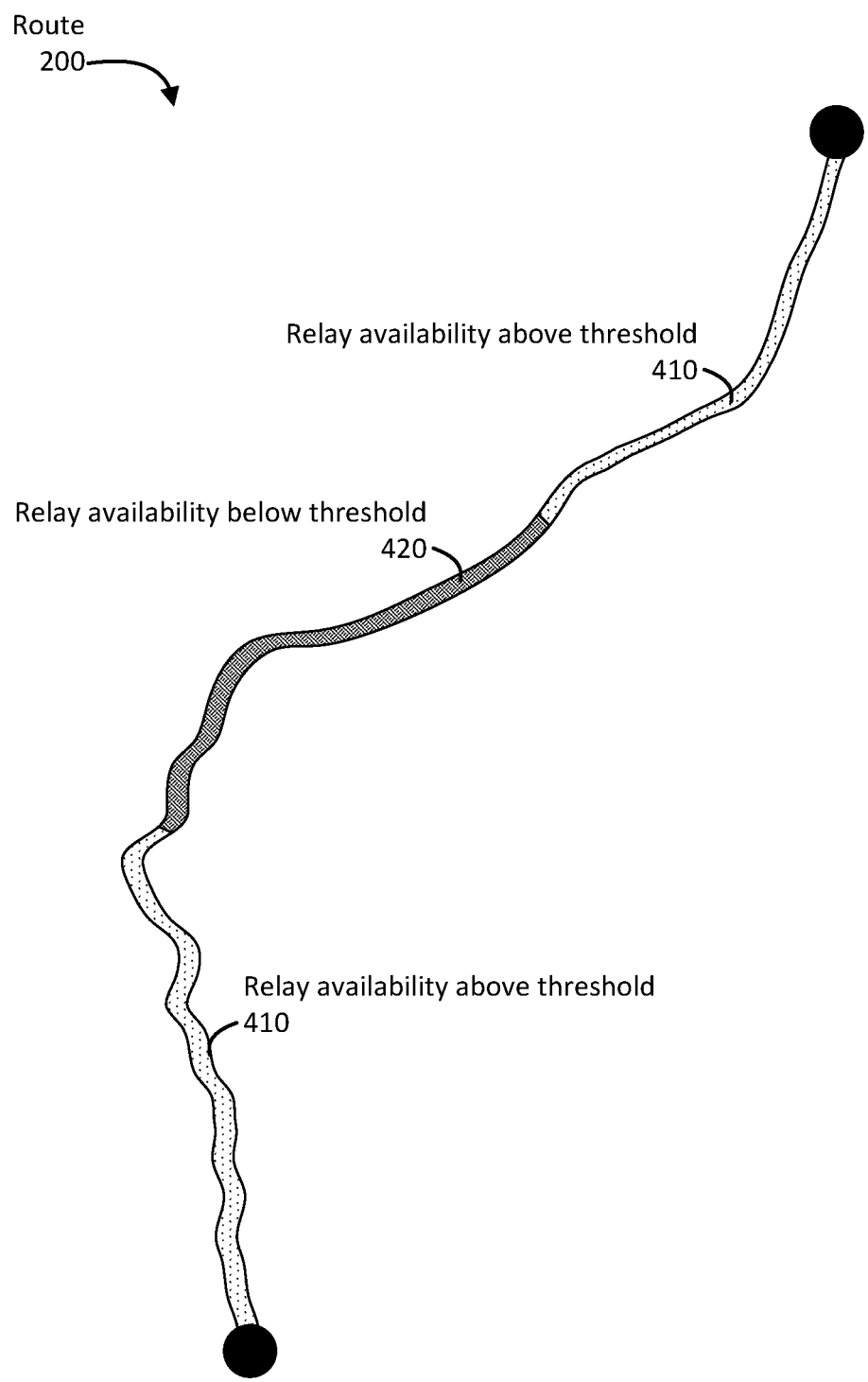
FIG. 4 is an example of relay availability information for the route of FIG. 2.

As noted, additional information can be provided to a server when a mobile device is providing crowdsourcing information regarding a route, in which case the server can compile additional information for the route (e.g. such as a mean temperature or mean traffic level for different segments of the route 200). FIG. 4 provides an example of this.

FIG. 4 is an illustration of relay availability for route 200. As previously noted, a mobile device providing crowdsourcing information may be capable of determining relay availability at different sensing locations along the route 200 and providing this with the coverage information. The server can then use this information to create relay availability information for the route as illustrated in FIG. 4. Relay availability may be indicated by an average number of other mobile devices nearby to the mobile device that have a capability to act as a relay device 135. A mobile device may detect a relay device 135 capability from signals (e.g. sidelink or downlink signals transmitted by a relay device 135 that indicates or implies a relay capability where a relay device 135 also has access to a wireless network), though in some cases (e.g. when a relay device 135 uses uplink/downlink signaling to perform relaying), it may not be possible to detect that downlink signals received are sent from a relay device 135 rather than from a wireless network.

Similar to coverage information, relay information may be conveyed in any of a variety ways. In the example shown in FIG. 4, the route 200 is separated into different segments having relay availability above a threshold 410 and relay availability below a threshold 420. This threshold may, for example, indicate a minimum average number of nearby relay devices 135 to ensure connectivity to a wireless network (via relay connections) above a certain probability. Of course, other embodiments may provide map-based information regarding relay availability in different manners, such non-binary gradations (e.g., "low," "medium," and "high" grouping), grouping by an average number of nearby relay devices (e.g., groups having 0-5, 6-10, or 11-15 connections, etc.), and so forth. Further, the segmenting of the route 200 may be performed differently, as previously described with regard to FIG. 3.

Figure 5:
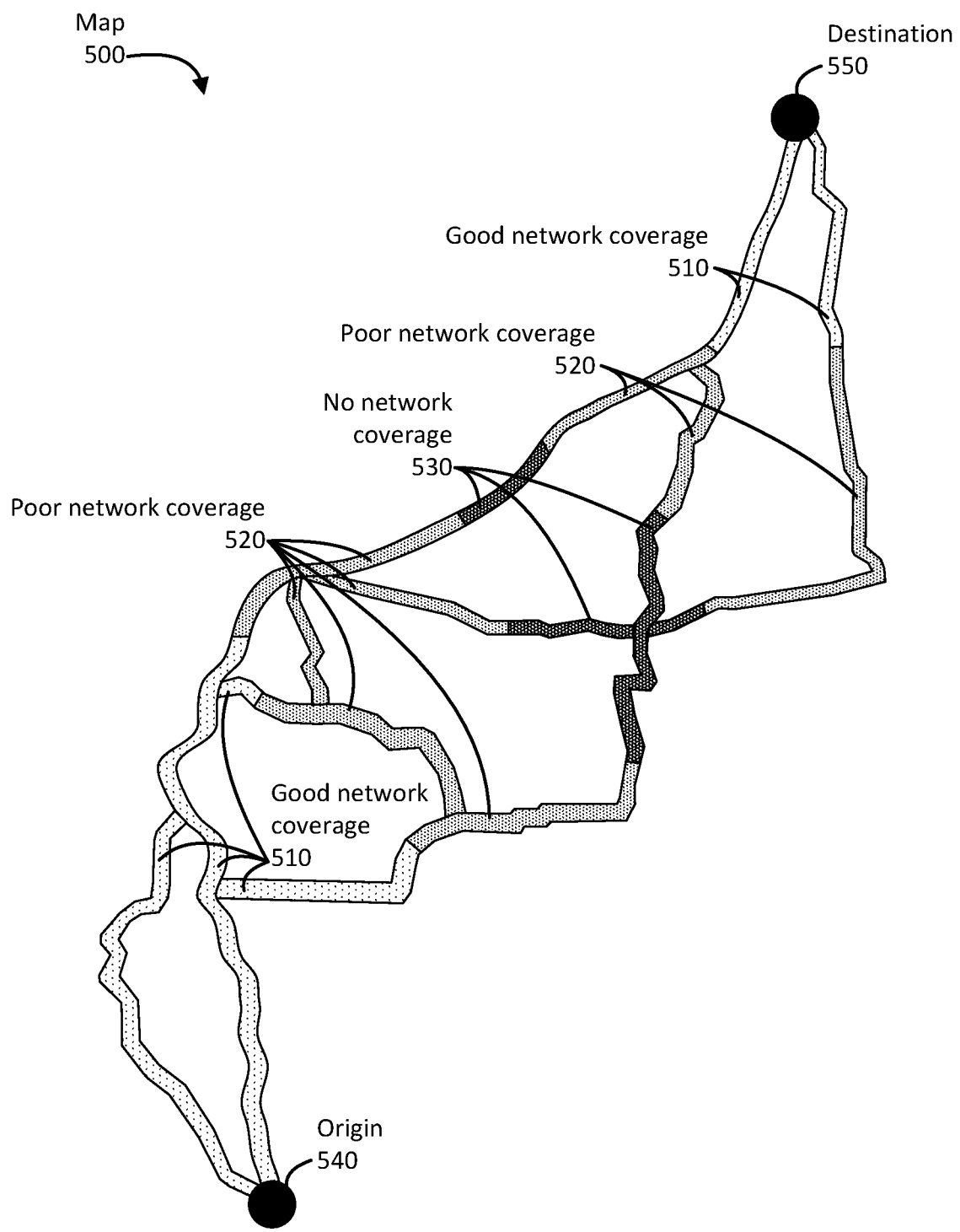
FIG. 5 is an illustration of an example coverage map that can be created and stored at a coverage server based on crowdsourced information from crowdsourcing mobile devices, according to some embodiments.

FIG. 5 is a figure of an example coverage map 500 that can be created and stored at a coverage server based on crowdsourced information from crowdsourcing mobile devices. That is, as mobile devices travel along various routes and report coverage information at various sensing locations (e.g., as described with regard to FIG. 2) a server is not only able to accumulate coverage information for a single route (e.g., as shown in FIG. 3 and FIG. 4), but may accumulate coverage information for some or all roads in an entire area. Accumulating coverage information may include obtaining an average or weighted average of coverage information (e.g. an average or weighted average of signal strength or signal power measurements) obtained from separate mobile devices for the same sensor locations and/or same road segments, which may improve the accuracy and reliability of the coverage information. For example, if at a particular sensor location, 90% of mobile devices report that coverage is available from networks A, B and C while 10% of mobile devices report that coverage is available from networks A and B but not C, the coverage server may determine that wireless coverage at the sensor location is always available from networks A and B but is only available from network C with a 10% probability.

As noted previously, data in a coverage map 500 may include time and/or day related information (e.g. an indication of an applicable period of time or applicable days in a week). In that case, a coverage server may create multiple coverage maps 500 for a particular area, where each coverage map 500 is restricted to a particular time period (e.g. 7:00 am to 6:00 pm) and/or a particular day or days in a week (e.g. weekdays or weekends).

As shown in the example, the map 500 includes road segments having good network coverage 510, poor network coverage 520, and no network coverage 530 for the entire area. In this way, the coverage server can determine route information for virtually any particular route from an origin 540 to a destination 550, which it can provide to mobile devices traveling along the particular route. Other information accompanying the coverage information can also be stored by the coverage server and provided to mobile devices in a similar manner. Because the coverage server can receive coverage and other crowdsourcing information from a plurality of mobile devices over time, it may detect and remove outlier data that does not conform with similar data (e.g., within a threshold) provided by other mobile devices. Removing outlier data in this manner can help ensure the integrity of the crowdsourced data stored by the coverage server.

Providing coverage information may be performed in various ways, depending on desired functionality. For a given route, which may be determined by the coverage server or provided by another device as previously explained, the coverage server may provide the coverage data corresponding to the route. Additionally or alternatively, if the coverage server also determines the route, for example, the route and coverage information may be provided together to the mobile device. Route information may be conveyed based on coverage (e.g., starting and ending points on a road or route defining a level of coverage), predetermined segments (e.g., describing coverage for separate 10 mile long segments (or segments having an alternative length) along the route), or a combination thereof. The provided coverage data may also be based in part on a time period and/or day of week during which a device will travel along the route.

With coverage information regarding a route, a mobile device can determine a plan or schedule for communicating while traveling along the route. This may involve determining when, where, and/or how to communicate with one or more remote devices, or any combination thereof. For example, a mobile device may determine particular locations along the route at which the mobile device will communicate location information to a remote device (e.g., a monitoring device 145 of FIG. 1). The coverage information can be used by the mobile device to determine which locations to use and the network(s) it may be able to use at each location, for example. For regions along the route having no network coverage, the mobile device may determine not to attempt to communicate location information, or may determine to use an NTN communication link (e.g., satellite network(s) 130 of FIG. 1). When traveling on the route, the mobile device may execute the communication plan based on the coverage map and a knowledge of where it is along the route. This location can be determined using a GNSS receiver (if available), or an approximate location may be estimated using sensor information (e.g., odometer and/or other information received from a vehicle, accelerometer information, etc.). According to some embodiments in which an approximate location is estimated, a mobile device may use known current and/or previous coverage to determine its location more accurately on the route as well as a likely period of continuing coverage or no coverage. The mobile device may then report its location to a monitoring device when coverage is indicated to be available. According to some embodiments, the entity to which the mobile device reports may comprise the entity from which the mobile device receives coverage information (e.g., the functionality of the coverage server 155 and monitoring device(s) 145 of FIG. 1 may be combined in a single entity). Additionally or alternatively, a mobile device using the coverage information for a route may also provide crowdsourcing information to the monitoring device(s) 145 or to a separate crowdsourcing server. Put differently, a single mobile device may utilize coverage information for a route and provide crowdsourcing information regarding route coverage in a single trip along the route. In this manner, a coverage map can be continuously updated (e.g., by a coverage server) based on up-to-date crowdsourced information. Algorithms used to identify and remove outlier information may then take into account the possibility that new information received by mobile devices may reflect changes in coverage.

Figure 6:
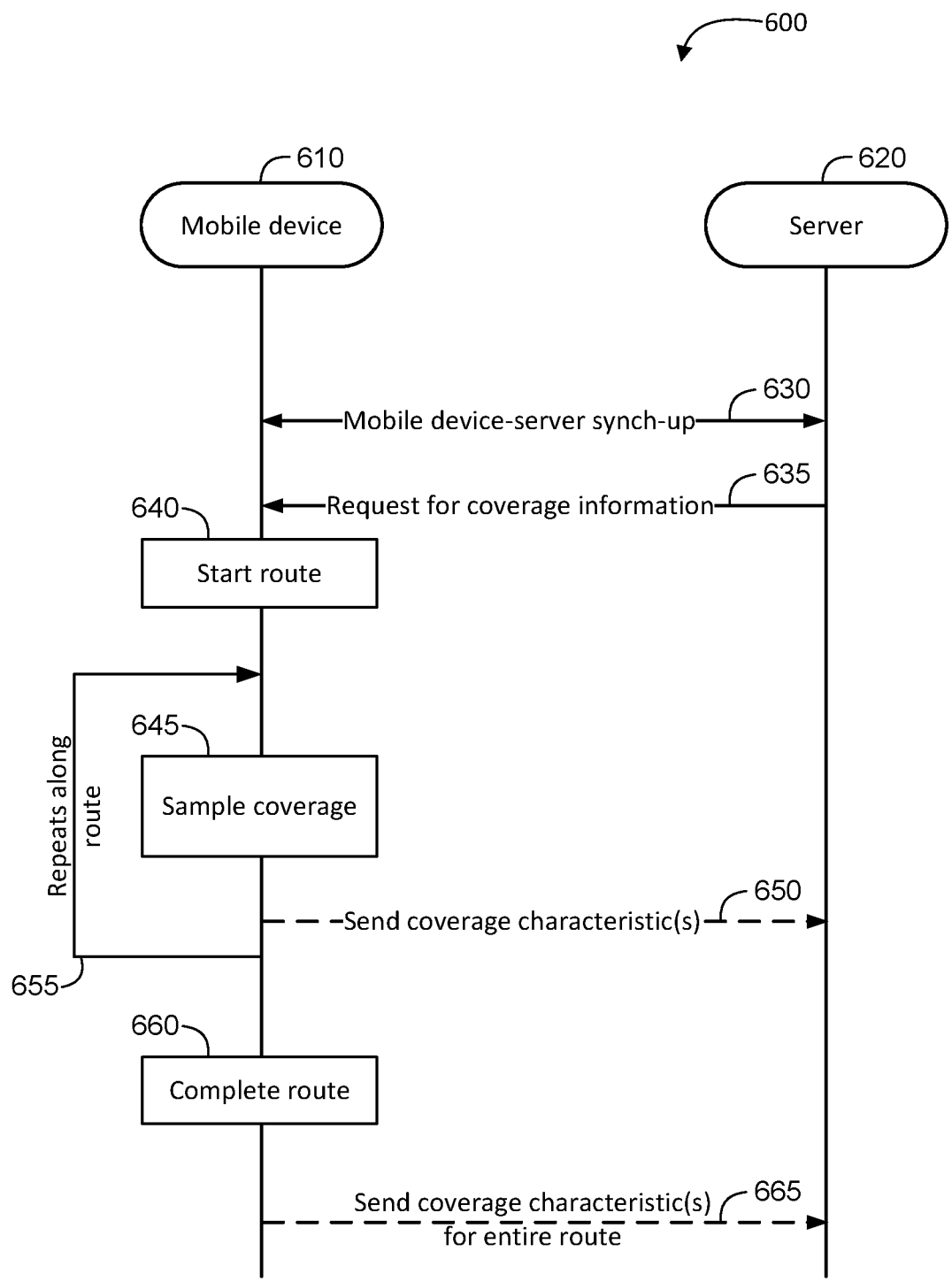
FIG. 6 is a signal flow diagram of a method of crowdsourcing, according to some embodiments.

FIG. 6 is a signal flow diagram of a method 600 of how crowdsourcing may be performed, according to some embodiments. As illustrated, the method 600 may be performed by a mobile device 610 and a server 620. The mobile device 610 may correspond with mobile device(s) 105 of FIG. 1, and, in particular, a crowdsourcing mobile device used to obtain wireless coverage information for a route of travel. As previously noted, a crowdsourcing mobile device may or may not use route-based coverage information when obtaining coverage information for the route. The server 620 may correspond with a coverage server as described elsewhere herein (e.g., coverage server 155 of FIG. 1). Depending on desired functionality, the server 620 may perform other functions described herein, such as for routing and/or monitoring mobile devices.

The method 600 may begin with operation 630, in which the mobile device 610 and server 620 synch up regarding prospective crowdsourcing. This may comprise the mobile device 610 indicating to the server 620 that it will travel along a route at some later date and/or time. This can be responsive to, for example, the mobile device 610 determining the route or receiving the route from another device (e.g., route server 150 of FIG. 1). In some embodiments, the operation 630 may comprise the server 620 indicating to the mobile device 610 that the mobile device 610 will move along a route at some later date and/or time. This may be responsive to a request from the mobile device 610 or another device for route information. Alternatively, the server 620 may be provided with an indication of the route, which it may relay to the mobile device 610.

At operation 635, the server 620 requests coverage information from the mobile device 610. According to some embodiments, the server 620 may decide to make the request at operation 635 in response to a determination that information in a coverage map for the route is insufficient and/or may need to be updated. According to some embodiments, the request for coverage information may include information regarding how coverage may be obtained by the mobile device. This can include, for example, an indication of sensing locations (e.g., sensing locations 230), a frequency (e.g., in time and/or distance) at which coverage information is to be obtained, an identity of one or more wireless networks from which coverage information is to be obtained, a format for reporting the coverage information, or combination thereof.

At operation 640, the mobile device then starts the route. As noted, the mobile device may comprise a device that is transported via a separate vehicle. According to some embodiments, the mobile device 610 may be notified when the route is started (e.g., via user input, a message received by another device, or the like). According to some embodiments, the mobile device 610 may automatically determine when travel along the route has started based on GNSS and/or other location data that indicates travel along the route.

Operations 645, 650, and 655 may occur during the route. Specifically, at operation 645, the mobile device 610 samples wireless coverage at a location. As noted in the previously-described embodiments, sampling wireless coverage may comprise determining whether RF signals can be received from one or more wireless networks and/or performing measurements to determine the power of RF signals received from one or more wireless networks. The mobile device may also sample other characteristics, such as weather, temperature, traffic, the presence of relay devices, and so forth. As indicated at operation 650, the mobile device may optionally send one or more coverage characteristics, indicative of the sampling. More specifically, the one or more characteristics may comprise an indication of whether there is or is not wireless coverage, a measurement of wireless signals from any of the one or more wireless networks, a timestamp of the measurement, a position at which the measurement was taken, or a combination thereof.

As noted by operation 655, operation 645 and (optionally) operation 650 may be repeated along the route at different locations until the mobile device completes the route, as noted at operation 660. Similar to starting the route, the mobile device 610 may be notified of the completion of the route via manual and/or automatic means. As shown by operation 665, the mobile device 610 may optionally send coverage characteristics for the entire route after completing the route. This may occur, for example, if the mobile device 610 does not perform operation 650.

Figure 7:
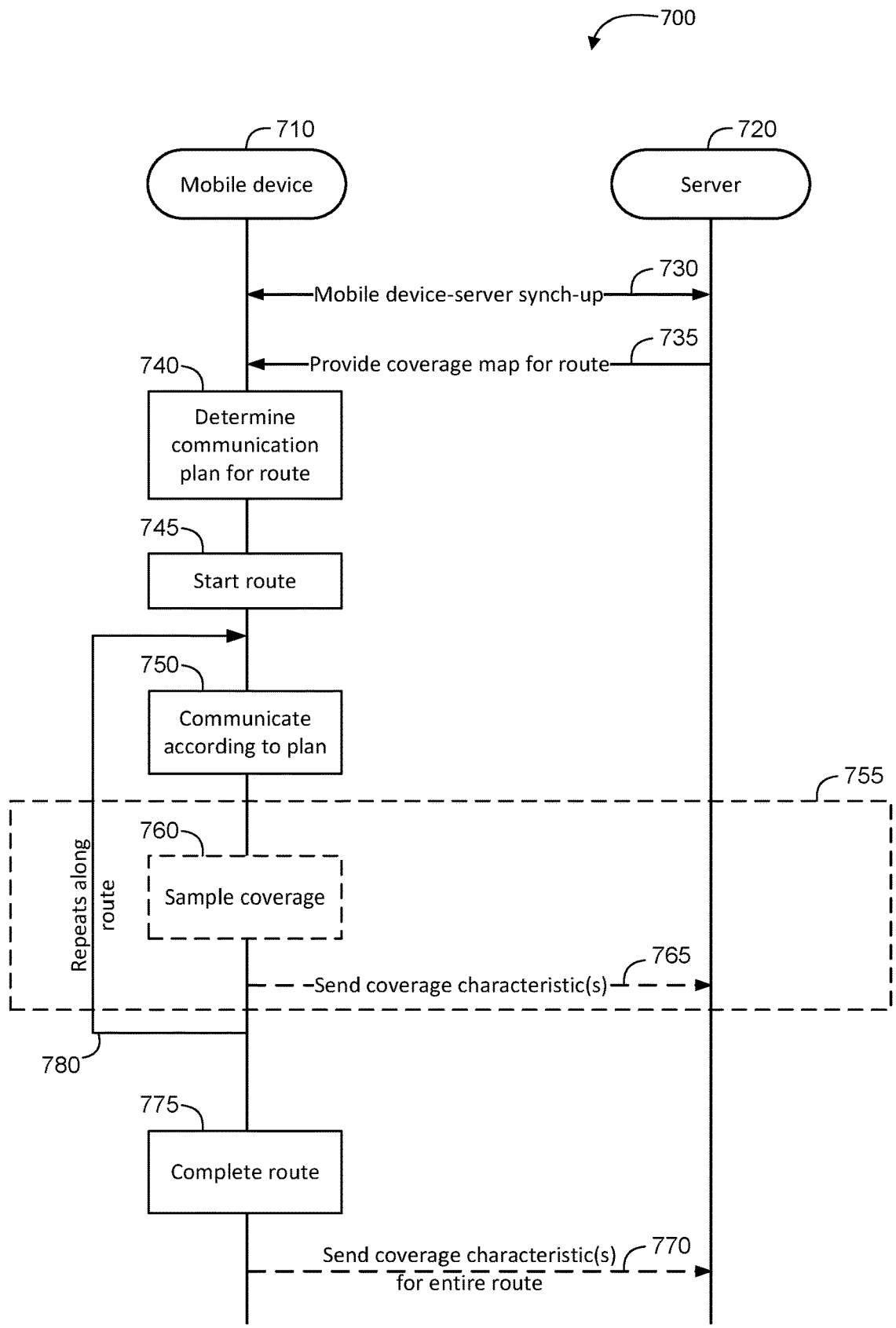
FIG. 7 is a signal flow diagram of a method of using route-based coverage information from a coverage map, according to some embodiments.

FIG. 7 is a signal flow diagram of a method 700 of how route-based coverage information from a coverage map may be used, according to some embodiments. As illustrated, the method 700 may be performed by a mobile device 710 and a server 720. The mobile device 710 may correspond with mobile device(s) 105 of FIG. 1, and, in particular, a mobile device that uses coverage information provided by the server 720 to determine when to communicate with a monitoring device (e.g., monitoring device 145). The mobile device 710 may be different than the mobile device 610 used in the method of 600. That said, as discussed below, the mobile device 710 may be used to obtain additional crowdsourcing information regarding coverage for a route. The server 720 again may correspond with a coverage server as described elsewhere herein (e.g., coverage server 155 of FIG. 1).

The method 600 may begin with operation 730, in which the mobile device 610 and server 620 synch up regarding the usage of coverage information regarding a route. This may comprise the mobile device 710 indicating to the server 720 that it will travel along the route at some later date and/or time or time period. This can be responsive to, for example, the mobile device 710 determining the route or receiving the route from another device (e.g., route server 150 of FIG. 1). In some embodiments, the operation 730 may comprise the server 720 indicating to the mobile device 710 that the mobile device 710 will move along a route at some later date and/or time or time period. This may be responsive to a request from the mobile device 710 or another device for route information. Alternatively, the server 720 may be provided with an indication of the route, which it may relay to the mobile device 610.

At operation 735, the server 720 provides coverage map information regarding the route, and possibly the date and/or time period for travel along the route, to the mobile device 610. As described in the previous embodiments, the server 720 may extract the coverage information for a route from a coverage map (e.g., as shown in the example of FIG. 5). Put differently, the coverage information for the route may comprise a portion of the coverage map corresponding to the route (e.g., as shown in FIG. 3).

Depending on desired functionality, coverage information may vary. Coverage information may include, for example, an indication for each of various points (or different segments) along the route of whether there is or is not wireless coverage (at each point or segment), a degree of wireless coverage, a power measurement of wireless signals from a wireless network, an identification of one or more wireless networks which either provide or do not provide wireless coverage, or a combination thereof. Further, as noted elsewhere herein, the server 720 may provide additional information regarding the route, such as weather, temperature, traffic, the presence or availability of relay devices, and so forth.

At operation 740, the mobile device 710 determines a communication plan, also referred to as a communication schedule, for the route. As previously described, the mobile device can determine a communication plan based on the coverage information and optional additional information regarding the route. This can include when, where, and/or how to communicate with a remote device (e.g., a monitoring device), or any combination thereof. Or specifically, according to some embodiments, the communication plan for a route may comprise a plurality of times for wirelessly communicating with the remote device, a plurality of locations for wirelessly communicating with the remote device, a wireless network used to wirelessly communicate with the remote device, whether to use a relay device to access a wireless network to wirelessly communicate with the remote device, whether to use an NTN to wirelessly communicate with the remote device, or a combination thereof.

At operation 745, the mobile device then starts the route. Similar to the method 600 of FIG. 6, according to some embodiments, the mobile device 710 may be notified when the route is started (e.g., via user input, a message received by another device, or the like). According to some embodiments, the mobile device 710 may automatically determine when travel along the route has started based on GNSS and/or other location data (e.g. an odometer or other sensor reading) indicating travel along the route.

At operation 750, the mobile device 710 communicates with a monitoring device (e.g. provides its current location to the monitoring device) according to the communication plan determined at operation 740. Again, this communication may be performed at a certain time-based and/or distance-based frequency, at certain locations, etc., which may be impacted based on coverage along the route. To communicate according to a communication plan (or schedule), the mobile device 710 may estimate its current location, which may be performed using a GNSS receiver and/or other sensors of the mobile device 710, as previously described and may then determine from the coverage map received at operation 735 that wireless coverage allowing the communication is or should be available at this location.

The operations in block 755 are optional crowdsourcing operations that may be performed by the mobile device 710 in some embodiments. The specific functionality of operations 760 and 765 (and subsequent operation 770) may echo counterpart functions in the method 600. That is, operations 760 and 765 may occur while the mobile device 710 is traveling along the route. At operation 760 the mobile device 710 samples wireless coverage at a location, and optionally samples other characteristics. This information may then be sent to the server 720 at operation 765, and/or may be sent (e.g., as a batch of information for all samples taken along the route) at operation 770 after completion of the route at operation 775. As indicated by operation 780 operation 750 and (optionally) crowdsourcing operations in block 755 may be repeated along the route at different locations until the mobile device completes the route at operation 775. Depending on desired functionality, locations at which the mobile device 710 communicates at operation 750 may be the same or may be different than locations at which the mobile device 710 performs the crowdsourcing operations in block 755.

By obtaining and providing route-based coverage information, the embodiments herein can provide various advantages over existing solutions. The route-based coverage information can help guide mobile devices with an effective solution that is not necessarily specific to the shipment industry. The coverage information provided to mobile devices can enable the mobile devices to determine a communication plan or schedule in which the mobile device can decide when to enter a sleep or power savings mode, and when to wake up. Devices can stay in sleep mode in areas with no coverage, saving power by avoiding scanning for available wireless networks. This can help enable mobile devices, such as IOT devices, to optimize battery efficiency above existing standards. Moreover, because many mobile devices can be used for crowdsourcing coverage information, data (e.g. measurements) can be combined (e.g. via averaging) and outlier data can be identified and omitted, helping ensure the trustworthiness and reliability of the coverage map. According to some embodiments, service can be used to manage or track mobile devices, and notify end-users with location updates (e.g., in real time) of the mobile devices. Moreover, as also noted, other conditions such as temperature, height, road conditions, traffic levels, or any combination thereof, can be gathered and conveyed to mobile devices and/or other entities traveling along the route.

Figure 8:
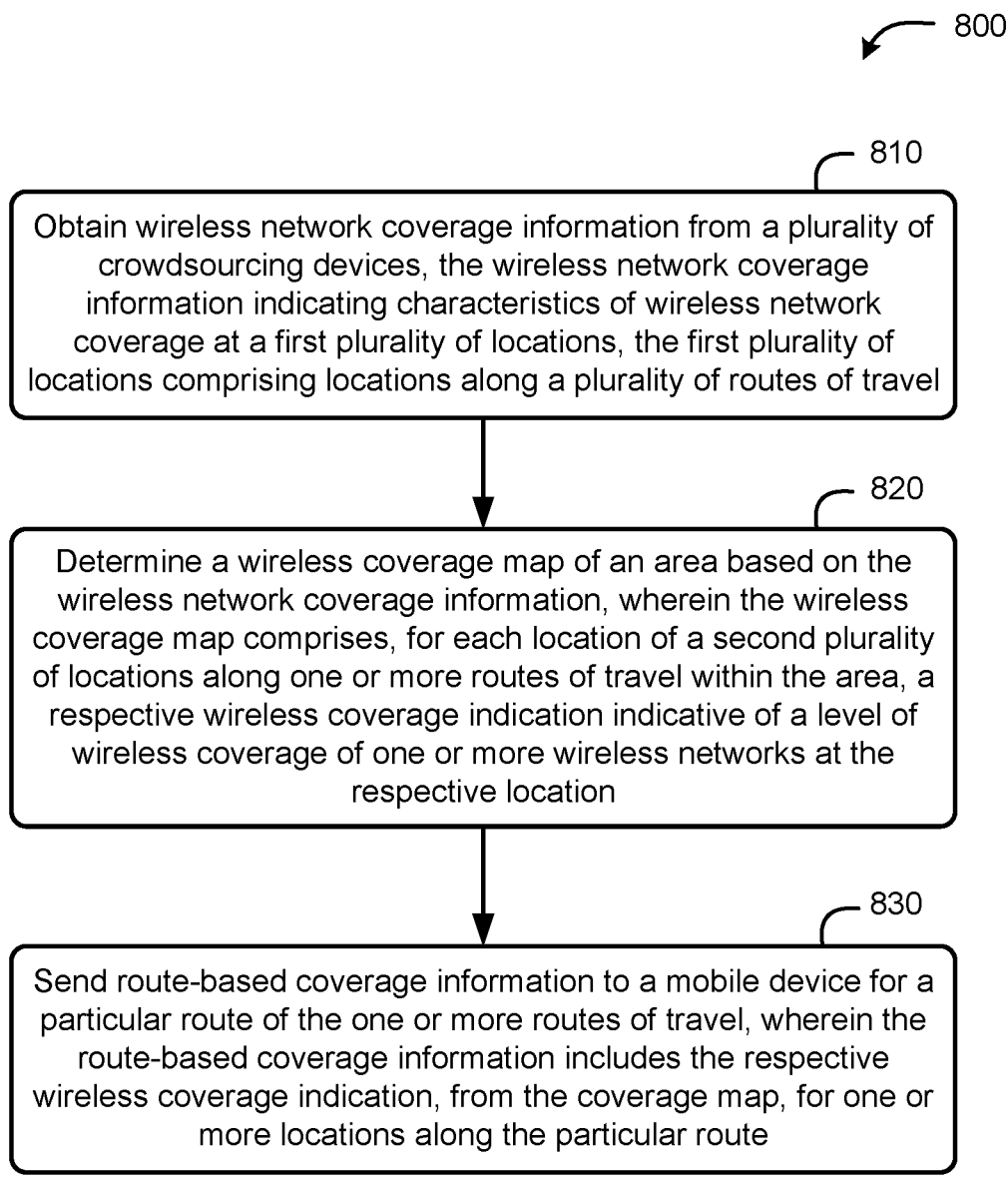
FIG. 8 is a flow diagram of a method at a server of providing route-based coverage information.

FIG. 8 is a method 800 at a server (e.g. a coverage server 155 or route server 150) of providing route-based coverage information, according to an embodiment. Aspects of the method 800 reflect the functionality of a server as described in the embodiments herein, including the functionality discussed with regard to the methods of FIGS. 6 and 7. The operations shown in the blocks of FIG. 8 may be performed by software and/or components of a computing device. An example of such components is described hereafter with regard to FIG. 11.

At block 810 the functionality comprises obtaining wireless network coverage information from a plurality of crowdsourcing devices, the wireless network coverage information indicating characteristics of wireless network coverage at a first plurality of locations, the first plurality of locations comprising locations along a plurality of routes of travel. As previously described with respect to FIG. 6, a server may obtain wireless network coverage information as part of a crowdsourcing process in which the server may request and subsequently receive coverage information from the plurality of crowdsourcing devices in an area for which a wireless coverage map is to be created or updated. According to some embodiments, the characteristics of wireless network coverage at the first plurality of locations comprise an indication of whether there is or is not wireless coverage, a measurement of wireless signals from any of one or more wireless networks, a timestamp of the measurement, a position at which the measurement was taken, or a combination thereof.

Figure 11:
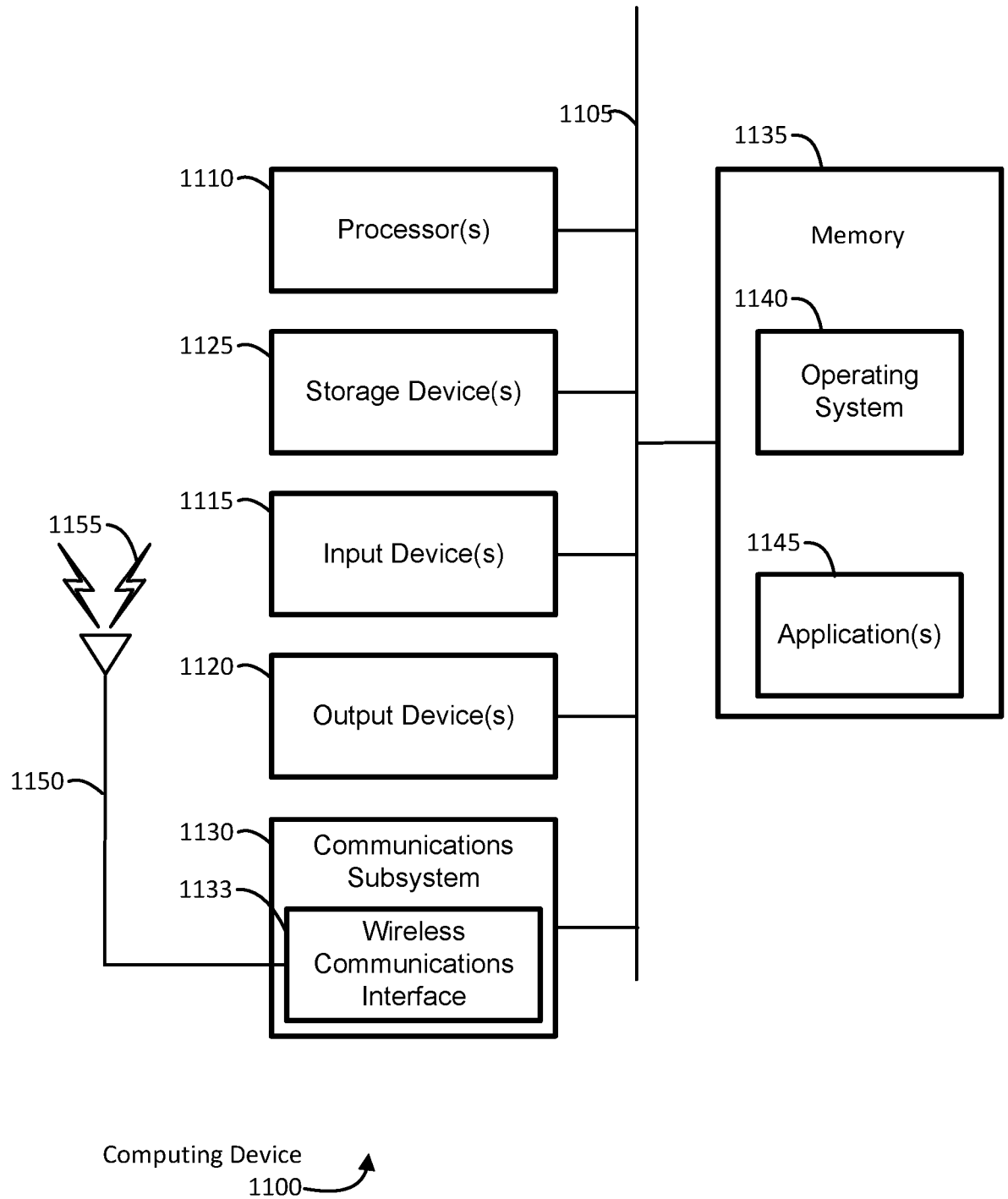
FIG. 11 is a block diagram of an embodiment of a computer system.

Means for performing functionality at block 810 may comprise a bus 1105, processor(s) 1110, storage device(s) 1125, communications subsystem 1130, memory 1135 (including operating system 1140 and/or application(s) 1145), and/or other components of a computer system 1100, as illustrated in FIG. 11.

At block 820 the functionality comprises determining a wireless coverage map of an area based on the wireless network coverage information, wherein the wireless coverage map comprises, for each location of a second plurality of locations along one or more routes of travel within the area, a respective wireless coverage indication indicative of a level of wireless coverage of the one or more wireless networks at the respective location. As indicated in previously-described embodiments (e.g., regarding FIGS. 2-5) the wireless coverage indication may indicate wireless coverage in different ways, depending on desired functionality. According to some embodiments of the method 800, the wireless coverage indication indicative of the level of wireless coverage of the one or more wireless networks comprises an indication of whether there is or is not wireless coverage, a degree of wireless coverage, a power measurement of wireless signals from a wireless network, an identification of one or more wireless networks which either provide or do not provide wireless coverage, a time period, or a combination thereof. Additionally or alternatively, the wireless coverage indication further indicates, for each wireless network of the one or more wireless networks, a likelihood that the respective wireless network is accessible via a relay connection to the wireless network. In such embodiments, the likelihood that the respective wireless network is accessible via a relay connection to the wireless network may be determined from information concerning the presence of relays included in the wireless network coverage information. Further, according to some embodiments, each location of the first plurality of locations and the second plurality of locations comprises a road segment along a respective route of travel, a fixed point along a respective route of travel, or a combination thereof.

Means for performing functionality at block 820 may comprise a bus 1105, processor(s) 1110, storage device(s) 1125, communications subsystem 1130, memory 1135 (including operating system 1140 and/or application(s) 1145), and/or other components of a computer system 1100, as illustrated in FIG. 11.

At block 830 the functionality comprises sending route-based coverage information to a mobile device (e.g. a mobile device 105) for a particular route of the one or more routes of travel, wherein the route-based coverage information includes the respective wireless coverage indication, from the coverage map, for one or more locations along the particular route. As previously described with respect to FIG. 7, a coverage map for a route may be provided in response to a request from the mobile device or another device (e.g., server). Accordingly, for some embodiments of the method 800, sending the mobile device the route-based coverage information for the particular route may be responsive to receiving a request from the mobile device for the route-based coverage information. Some embodiments may further comprise receiving the particular route from the mobile device or from another server. Further, according to some embodiments, the server itself may determine the route. Thus, some embodiments of the method 800 may comprise determining the particular route for the mobile device based on an origin and a destination, wherein sending the mobile device the route-based coverage information for the particular route comprises sending the route-based coverage information along with information regarding the particular route.

Means for performing functionality at block 830 may comprise a bus 1105, processor(s) 1110, storage device(s) 1125, communications subsystem 1130, memory 1135 (including operating system 1140 and/or application(s) 1145), and/or other components of a computer system 1100, as illustrated in FIG. 11.

Figure 9:
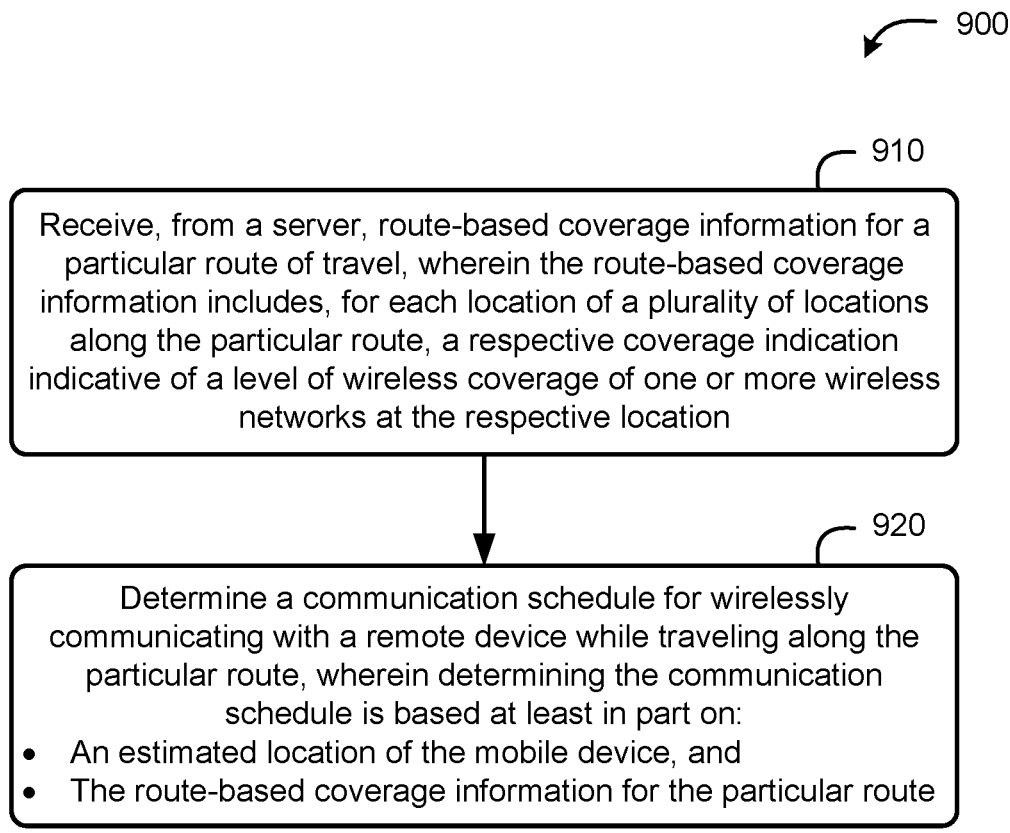
FIG. 9 is a flow diagram of a method at a mobile device of using route-based coverage information.

FIG. 9 is a method 900 at a mobile device (e.g. a mobile device 105) of using route-based coverage information, according to an embodiment. Aspects of the method 900 reflect the functionality of a mobile device as described in the embodiments herein, including the functionality discussed with regard to the methods of FIGS. 6 and 7. The operations shown in the blocks of FIG. 9 may be performed by software and/or components of a mobile device. An example of such components is described hereafter with regard to FIG. 10.

At block 910, the functionality comprises receiving, from a server (e.g. a route server 150 or coverage server 155), route-based coverage information for a particular route of travel, wherein the route-based coverage information includes, for each location of a plurality of locations along the particular route, a respective coverage indication indicative of a level of wireless coverage of one or more wireless networks at the respective location. Depending on desired functionality, each location of the plurality of locations may comprise a road segment along a respective route of travel, a fixed point along a respective route of travel, or a combination thereof. According to some embodiments, the coverage indication indicative of the level of wireless coverage of the one or more wireless networks may comprise an indication of whether there is or is not wireless coverage, a degree of wireless coverage, a power measurement of wireless signals from a wireless network, an identification of one or more wireless networks which either provide or do not provide wireless coverage, a time period, or a combination thereof. According to some embodiments, the coverage indication may further indicate, for each wireless network of the one or more wireless networks, a likelihood that the respective wireless network is accessible via a relay connection to the wireless network.

According to some embodiments, the functionality at block 910 may be part of a larger process. For example, according to some embodiments, the method 900 may comprise, prior to receiving the route-based coverage information for the particular route, sending a request to the server for the route-based coverage information for the particular route. In such embodiments, the request may include information regarding the particular route. Such embodiments further may comprise receiving the information regarding the particular route from another server.

Figure 10:
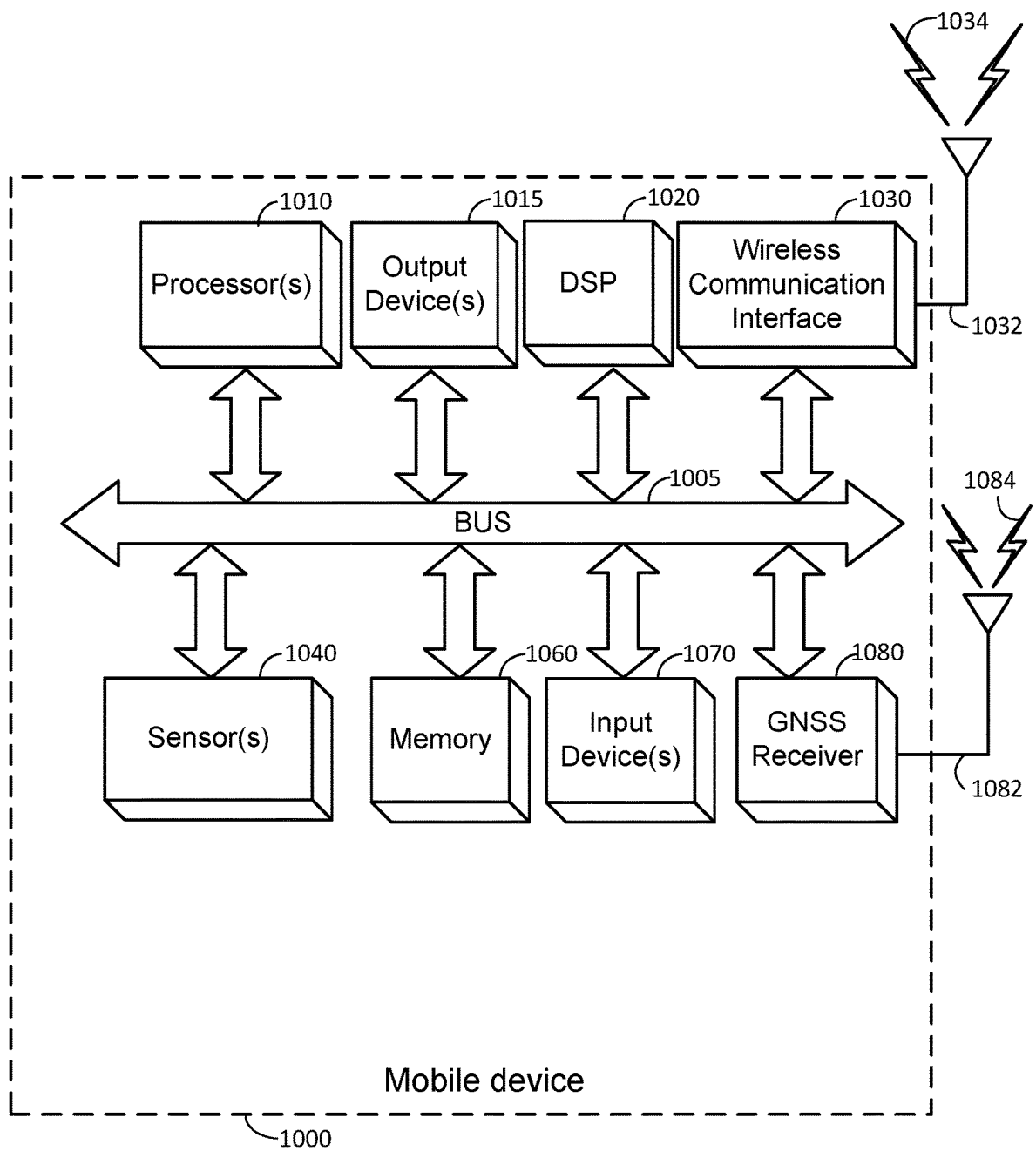
FIG. 10 is a block diagram of an embodiment of a mobile device.

Means for performing functionality at block 910 may comprise a bus 1005, processor(s) 1010, digital signal processor (DSP) 1020, wireless communication interface 1030, sensor(s) 1040, memory 1060, GNSS receiver 1080, and/or other components of a mobile device 1000, as illustrated in FIG. 10.

At block 920, the functionality comprises determining a communication schedule for wirelessly communicating with a remote device while traveling along the particular route, wherein determining the communication schedule is based at least in part on an estimated location of the mobile device, and the route-based coverage information for the particular route. As noted in previously-described embodiments, a communication schedule, or plan, may relate to how, when, and/or where to communicate. Thus, according to some embodiments of the method, determining the communication schedule may comprise determining a plurality of times for wirelessly communicating with the remote device, determining a plurality of locations for wirelessly communicating with the remote device, determining a wireless network used to wirelessly communicate with the remote device, using a relay device to access a wireless network to wirelessly communicate with the remote device, using a non-terrestrial network (e.g. a satellite network) to wirelessly communicate with the remote device, or a combination thereof.

Means for performing functionality at block 920 may comprise a bus 1005, processor(s) 1010, digital signal processor (DSP) 1020, wireless communication interface 1030, sensor(s) 1040, memory 1060, GNSS receiver 1080, and/or other components of a mobile device 1000, as illustrated in FIG. 10.

Some embodiments of the method 900 may further comprise one or more additional features described in the previously-described embodiments. For example, some embodiments of the method 900 may further comprise sending a coverage report, to the server, for each of one or more reporting locations along the particular route, wherein the coverage report includes characteristics of wireless network coverage for each of the one or more reporting locations. The characteristics of wireless network coverage for each of the one or more reporting locations may comprise an indication of whether there is or is not wireless coverage, a measurement of wireless signals from any of the one or more wireless networks, a timestamp of the measurement, a position at which the measurement was taken, or a combination thereof.

FIG. 10 is a block diagram of an embodiment of a mobile device 1000, which can be utilized as described herein above (e.g., in association with the previously-described figures). For example, the mobile device 1000 may be utilized as and/or correspond with mobile device(s) 105, relay device(s) 135, monitoring device(s) 145, mobile device 610, mobile device 710, or any combination thereof, as described herein. It should be noted that FIG. 10 is meant only to provide a generalized illustration of various components, any or all of which may be utilized as appropriate. Furthermore, the functionality of a UE discussed herein (e.g. a mobile device 105) may be executed by one or more of the hardware and/or software components illustrated in FIG. 10.

The mobile device 1000 is shown comprising hardware elements that can be electrically coupled via a bus 1005 (or may otherwise be in communication, as appropriate). The hardware elements may include a processor(s) 1010 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1010 may comprise one or more processing units, which may be housed in a single integrated circuit (IC) or multiple ICs. As shown in FIG. 10, some embodiments may have a separate DSP 1020, depending on desired functionality. Location determination and/or other determinations based on wireless communication may be provided in the processor(s) 1010 and/or wireless communication interface 1030 (discussed below). The mobile device 1000 also can include one or more input devices 1070, which can include without limitation one or more keyboards, touch screens, touch pads, microphones, buttons, dials, switches, and/or the like; and one or more output devices 1015, which can include without limitation one or more displays (e.g., touch screens), light emitting diodes (LEDs), speakers, and/or the like.

The mobile device 1000 may also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile device 1000 to communicate with other devices as described in the embodiments above. The wireless communication interface 1030 may permit data and signaling to be communicated (e.g., transmitted and received) with TRPs of a network, for example, via eNB s, gNBs, ng-eNB s, access points, various base stations and/or other access node types, and/or other network components, computer systems, and/or any other electronic devices communicatively coupled with TRPs, as described herein. The communication can be carried out via one or more wireless communication antenna(s) 1032 that send and/or receive wireless signals 1034. According to some embodiments, the wireless communication antenna(s) 1032 may comprise a plurality of discrete antennas, antenna arrays, or any combination thereof. The antenna(s) 1032 may be capable of transmitting and receiving wireless signals using beams (e.g., Tx beams and Rx beams). Beam formation may be performed using digital and/or analog beam formation techniques, with respective digital and/or analog circuitry. The wireless communication interface 1030 may include such circuitry.

Depending on desired functionality, the wireless communication interface 1030 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile device 1000 may communicate with different data networks that may comprise various network types. For example, one such network type may comprise a wireless wide area network (WWAN), which may be a code-division multiple access (CDMA) network, a time division multiple access (TDMA) network, a frequency division multiple access (FDMA) network, an orthogonal frequency division multiple access (OFDMA) network, a single-carrier frequency division multiple access (SC-FDMA) network, a WiMAX (IEEE 802.16) network, and so on. A CDMA network may implement one or more radio access technologies (RATs) such as CDMA2000®, wideband code division multiple access (WCDMA), and so on. CDMA2000® includes IS-95, IS-2000 and/or IS-856 standards. A TDMA network may implement global system for mobile communications (GSM), digital advanced mobile phone system (D-AMPS), or some other RAT. An OFDMA network may employ long-term evolution (LTE), LTE Advanced, fifth-generation (5G) new radio (NR), and so on. 5G NR, LTE, LTE Advanced, GSM, and WCDMA are described in documents from 3rd Generation Partnership Project (3GPP). CDMA2000® is described in documents from a consortium named "3rd Generation Partnership Project 2" (3GPP2).

3GPP and 3GPP2 documents are publicly available. A wireless local area network (WLAN) may also be an IEEE 802.11x network, and a wireless personal area network (WPAN) may be a Bluetooth network, an IEEE 802.15x network, or some other type of network. The techniques described herein may also be used for any combination of WWAN, WLAN and/or WPAN.

The mobile device 1000 can further include sensor(s) 1040. Sensor(s) 1040 may comprise, without limitation, one or more inertial sensors and/or other sensors (e.g., accelerometer(s), gyro scope(s), camera(s), magnetometer(s), altimeter(s), microphone(s), proximity sensor(s), light sensor(s), barometer(s), and the like), some of which may be used to obtain position-related measurements and/or other information (e.g., for determining an approximate location of a the mobile device 1000, as described herein).

Embodiments of the mobile device 1000 may also include a GNSS receiver 1080 capable of receiving signals 1084 from one or more GNSS satellites using an antenna 1082 (which could be the same as antenna 1032). Positioning based on GNSS signal measurement can be utilized to complement and/or incorporate the techniques described herein. The GNSS receiver 1080 can extract a position of the mobile device 1000, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1080 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1080 is illustrated in FIG. 10 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1010, DSP 1020, and/or a processor within the wireless communication interface 1030 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processors, such as processor(s) 1010 or DSP 1020.

The mobile device 1000 may further include and/or be in communication with a memory 1060. The memory 1060 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the mobile device 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the mobile device 1000 (and/or processor(s) 1010 or DSP 1020 within mobile device 1000). In some embodiments, then, such code and/or instructions can be used to configure and/or adapt a general-purpose computer (or other device) to perform one or more operations in accordance with the described methods.

FIG. 11 is a block diagram of an embodiment of a computer system 1100, which may be used, in whole or in part, to provide the functions of one or more components and/or devices as described in the embodiments herein, including a server. Thus, the computer system 1100 may be utilized as and/or correspond with a route server 150, a coverage server 155, monitoring device(s) 145, server 620, server 720, or any combination thereof, as described herein. This may include, for example, a computer server, personal computer, personal electronic device, or the like. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner. In addition, it can be noted that components illustrated by FIG. 11 can be localized to a single device and/or distributed among various networked devices, which may be disposed at different geographical locations.

The computer system 1100 is shown comprising hardware elements that can be electrically coupled via a bus 1105 (or may otherwise be in communication, as appropriate). The hardware elements may include processor(s) 1110, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1100 also may comprise one or more input devices 1115, which may comprise without limitation a mouse, a keyboard, a camera, a microphone, and/or the like; and one or more output devices 1120, which may comprise without limitation a display device, a printer, and/or the like.

The computer system 1100 may further include (and/or be in communication with) one or more non-transitory storage devices 1125, which can comprise, without limitation, local and/or network accessible storage, and/or may comprise, without limitation, a disk drive, a drive array, an optical storage device, a solid-state storage device, such as a random-access memory (RAM) and/or read-only memory (ROM), which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1100 may also include a communications subsystem 1130, which may comprise wireless communication technologies managed and controlled by a wireless communication interface 1133, as well as wired technologies (such as Ethernet, coaxial communications, universal serial bus (USB), and the like). The wireless communication interface 1133 may comprise one or more wireless transceivers that may send and receive wireless signals 1155 (e.g., signals according to 5G NR or LTE) via wireless antenna(s) 1150. Thus the communications subsystem 1130 may comprise a modem, a network card (wireless or wired), an infrared communication device, a wireless communication device, and/or a chipset, and/or the like, which may enable the computer system 1100 to communicate on any or all of the communication networks described herein to any device on the respective network, including a User Equipment (UE), base stations and/or other transmission reception points (TRPs), and/or any other electronic devices described herein. Hence, the communications subsystem 1130 may be used to receive and send data as described in the embodiments herein.

In many embodiments, the computer system 1100 will further comprise a working memory 1135, which may comprise a RAM or ROM device, as described above. Software elements, shown as being located within the working memory 1135, may comprise an operating system 1140, device drivers, executable libraries, and/or other code, such as one or more applications 1145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1125 described above. In some cases, the storage medium might be incorporated within a computer system, such as computer system 1100. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method at a server of providing route-based coverage information, the method comprising: obtaining wireless network coverage information from a plurality of crowdsourcing devices, the wireless network coverage information indicating characteristics of wireless network coverage at a first plurality of locations, the first plurality of locations comprising locations along a plurality of routes of travel; determining a wireless coverage map of an area based on the wireless network coverage information, wherein the wireless coverage map comprises, for each location of a second plurality of locations along one or more routes of travel within the area, a respective wireless coverage indication indicative of a level of wireless coverage of one or more wireless networks at the respective location; and sending route-based coverage information to a mobile device for a particular route of the one or more routes of travel, wherein the route-based coverage information includes the respective wireless coverage indication, from the coverage map, for one or more locations along the particular route.

Clause 2. The method of clause 1, wherein each location of the first plurality of locations and the second plurality of locations comprises: a road segment along a respective route of travel, a fixed point along a respective route of travel, or a combination thereof.

Clause 3. The method of any one of clauses 1-2 wherein the wireless coverage indication indicative of the level of wireless coverage of the one or more wireless networks comprises: an indication of whether there is or is not wireless coverage, a degree of wireless coverage, a power measurement of wireless signals from a wireless network, an identification of one or more wireless networks which either provide or do not provide wireless coverage, a time period, or a combination thereof.

Clause 4. The method of any one of clauses 1-3 wherein the wireless coverage indication further indicates, for each wireless network of the one or more wireless networks, a likelihood that the respective wireless network is accessible via a relay connection to the wireless network.

Clause 5. The method of clause 4 wherein the likelihood that the respective wireless network is accessible via a relay connection to the wireless network is determined from information concerning the presence of relays included in the wireless network coverage information.

Clause 6. The method of any one of clauses 1-5 wherein the characteristics of wireless network coverage at the first plurality of locations comprise: an indication of whether there is or is not wireless coverage, a measurement of wireless signals from any of the one or more wireless networks, a timestamp of the measurement, a position at which the measurement was taken, or a combination thereof.

Clause 7. The method of any one of clauses 1-6 wherein sending the mobile device the route-based coverage information for the particular route is responsive to receiving a request from the mobile device for the route-based coverage information.

Clause 8. The method of any one of clauses 1-7 further comprising receiving the particular route from the mobile device or from another server.

Clause 9. The method of any one of clauses 1-8 further comprising determining the particular route for the mobile device based on an origin and a destination, wherein sending the mobile device the route-based coverage information for the particular route comprises sending the route-based coverage information along with information regarding the particular route.

Clause 10. A method at a mobile device of using route-based coverage information, the method comprising: receiving, from a server, route-based coverage information for a particular route of travel, wherein the route-based coverage information includes, for each location of a plurality of locations along the particular route, a respective coverage indication indicative of a level of wireless coverage of one or more wireless networks at the respective location; and determining a communication schedule for wirelessly communicating with a remote device while traveling along the particular route, wherein determining the communication schedule is based at least in part on: an estimated location of the mobile device, and the route-based coverage information for the particular route.

Clause 11. The method of clause 10, wherein determining the communication schedule comprises: determining a plurality of times for wirelessly communicating with the remote device, determining a plurality of locations for wirelessly communicating with the remote device, determining a wireless network used to wirelessly communicate with the remote device, using a relay device to access a wireless network to wirelessly communicate with the remote device, using a non-terrestrial network to wirelessly communicate with the remote device, or a combination thereof.

Clause 12. The method of any one of clauses 10-11 further comprising sending a coverage report, to the server, for each of one or more reporting locations along the particular route, wherein the coverage report includes characteristics of wireless network coverage for each of the one or more reporting locations.

Clause 13. The method of clause 12 wherein the characteristics of wireless network coverage for each of the one or more reporting locations comprise: an indication of whether there is or is not wireless coverage, a measurement of wireless signals from any of the one or more wireless networks, a timestamp of the measurement, a position at which the measurement was taken, or a combination thereof.

Clause 14. The method of any one of clauses 10-13 wherein each location of the plurality of locations comprises: a road segment along a respective route of travel, a fixed point along a respective route of travel, or a combination thereof.

Clause 15. The method of any one of clauses 10-14 wherein the coverage indication indicative of the level of wireless coverage of the one or more wireless networks comprises: an indication of whether there is or is not wireless coverage, a degree of wireless coverage, a power measurement of wireless signals from a wireless network, an identification of one or more wireless networks which either provide or do not provide wireless coverage, a time period, or a combination thereof.

Clause 16. The method of any one of clauses 10-15 wherein the coverage indication further indicates, for each wireless network of the one or more wireless networks, a likelihood that the respective wireless network is accessible via a relay connection to the wireless network.

Clause 17. The method of any one of clauses 10-16 further comprising, prior to receiving the route-based coverage information for the particular route, sending a request to the server for the route-based coverage information for the particular route.

Clause 18. The method of clause 17 wherein the request includes information regarding the particular route.

Clause 19. The method of any one of clauses 17-18 further comprising receiving the information regarding the particular route from another server.

Clause 20. A server comprising: a transceiver; a memory; and one or more processors communicatively coupled with the transceiver and the memory, wherein the one or more processors are configured to: obtain wireless network coverage information via the transceiver from a plurality of crowdsourcing devices, the wireless network coverage information indicating characteristics of wireless network coverage at a first plurality of locations, the first plurality of locations comprising locations along a plurality of routes of travel; determine a wireless coverage map of an area based on the wireless network coverage information, wherein the wireless coverage map comprises, for each location of a second plurality of locations along one or more routes of travel within the area, a respective wireless coverage indication indicative of a level of wireless coverage of one or more wireless networks at the respective location; and send route-based coverage information via the transceiver to a mobile device for a particular route of the one or more routes of travel, wherein the route-based coverage information includes the respective wireless coverage indication, from the coverage map, for one or more locations along the particular route.

Clause 21. The server of clause 20, wherein the one or more processors are configured to include, in the wireless coverage indication indicative of the level of wireless coverage of the one or more wireless networks: an indication of whether there is or is not wireless coverage, a degree of wireless coverage, a power measurement of wireless signals from a wireless network, an identification of one or more wireless networks which either provide or do not provide wireless coverage, a time period, or a combination thereof.

Clause 22. The server of any one of clauses 20-21 wherein the one or more processors are configured to include, in the wireless coverage indication for each wireless network of the one or more wireless networks, a likelihood that the respective wireless network is accessible via a relay connection to the wireless network.

Clause 23. The server of clause 22 wherein the one or more processors are configured to determine the likelihood that the respective wireless network is accessible via a relay connection to the wireless network is from information concerning the presence of relays included in the wireless network coverage information.

Clause 24. The server of any one of clauses 20-23 wherein the one or more processors are configured to send the mobile device the route-based coverage information for the particular route responsive to receiving a request from the mobile device for the route-based coverage information.

Clause 25. A mobile device comprising: a transceiver; a memory; and one or more processors communicatively coupled with the transceiver and the memory, wherein the one or more processors are configured to: receive, via the transceiver from a server, route-based coverage information for a particular route of travel, wherein the route-based coverage information includes, for each location of a plurality of locations along the particular route, a respective coverage indication indicative of a level of wireless coverage of one or more wireless networks at the respective location; and determine a communication schedule for wirelessly communicating with a remote device while traveling along the particular route, wherein determining the communication schedule is based at least in part on: an estimated location of the mobile device, and the route-based coverage information for the particular route.

Clause 26. The mobile device of clause 25, wherein, to determine the communication schedule, the one or more processors are configured to: determine a plurality of times for wirelessly communicating with the remote device, determine a plurality of locations for wirelessly communicating with the remote device, determine a wireless network used to wirelessly communicate with the remote device, use a relay device to access a wireless network to wirelessly communicate with the remote device, use a non-terrestrial network to wirelessly communicate with the remote device, or a combination thereof.

Clause 27. The mobile device of any one of clauses 25-26 wherein the one or more processors are further configured to send a coverage report, to the server, for each of one or more reporting locations along the particular route, wherein the coverage report includes characteristics of wireless network coverage for each of the one or more reporting locations.

Clause 28. The mobile device of any one of clauses 25-27 wherein, to receive the coverage indication indicative of the level of wireless coverage of the one or more wireless networks, the one or more processors are configured to receive an indication of whether there is or is not wireless coverage, a degree of wireless coverage, a power measurement of wireless signals from a wireless network, an identification of one or more wireless networks which either provide or do not provide wireless coverage, a time period, or a combination thereof.

Clause 29. The mobile device of any one of clauses 25-28 wherein, to receive the coverage indication indicative of the level of wireless coverage of the one or more wireless networks, the one or more processors are configured to receive, for each wireless network of the one or more wireless networks, a likelihood that the respective wireless network is accessible via a relay connection to the wireless network.

Clause 30. The mobile device of any one of clauses 25-29 wherein the one or more processors are further configured to, prior to receiving the route-based coverage information for the particular route, send a request to the server for the route-based coverage information for the particular route.

Clause 31. An apparatus having means for performing the method of any one of clauses 1-30.

Clause 32. A non-transitory computer-readable medium storing instructions, the instructions comprising code for performing the method of any one of clauses 1-30.

What is claimed is:

1. A method at a server of providing route-based coverage information, the method comprising:
    obtaining wireless network coverage information from a plurality of crowdsourcing devices, the wireless network coverage information indicating characteristics of wireless network coverage at a first plurality of locations, the first plurality of locations comprising locations along a plurality of routes of travel;
    determining a wireless coverage map of an area based on the wireless network coverage information, wherein:
        the wireless coverage map comprises, for each location of a second plurality of locations along one or more routes of travel within the area, a respective wireless coverage indication indicative of a level of wireless coverage of one or more wireless networks at the respective location; and
        the wireless coverage indication additionally indicates, for each wireless network of the one or more wireless networks, a likelihood that the respective wireless network is accessible via a relay connection to the respective wireless network; and
    sending route-based coverage information to a mobile device for a particular route of the one or more routes of travel, wherein the route-based coverage information includes the respective wireless coverage indication, from the coverage map, for one or more locations along the particular route.

2. The method of claim 1, wherein each location of the first plurality of locations and the second plurality of locations comprises:
    a road segment along a respective route of travel,
    a fixed point along a respective route of travel, or
    a combination thereof.

3. The method of claim 1, wherein the wireless coverage indication indicative of the level of wireless coverage of the one or more wireless networks comprises:
    an indication of whether there is or is not wireless coverage,
    a degree of wireless coverage,
    a power measurement of wireless signals from a wireless network,
    an identification of one or more wireless networks which either provide or do not provide wireless coverage,
    a time period, or
    a combination thereof.

4. The method of claim 1, wherein the likelihood that the respective wireless network is accessible via a relay connection to the wireless network is determined from information concerning the presence of relays included in the wireless network coverage information.

5. The method of claim 1, wherein the characteristics of wireless network coverage at the first plurality of locations comprise:
    an indication of whether there is or is not wireless coverage,
    a measurement of wireless signals from any of the one or more wireless networks,
    a timestamp of the measurement,
    a position at which the measurement was taken, or
    a combination thereof.

6. The method of claim 1, wherein sending the mobile device the route-based coverage information for the particular route is responsive to receiving a request from the mobile device for the route-based coverage information.

7. The method of claim 1, further comprising receiving the particular route from the mobile device or from another server.

8. The method of claim 1, further comprising determining the particular route for the mobile device based on an origin and a destination, wherein sending the mobile device the route-based coverage information for the particular route comprises sending the route-based coverage information along with information regarding the particular route.

9. The method of claim 1, wherein the likelihood that the respective wireless network is accessible via the relay connection to the respective wireless network includes an indication, for each location of the second plurality of locations, a respective relay availability indication indicative of whether relay availability at the respective location is above a threshold.

10. A method at a mobile device of using route-based coverage information, the method comprising:
    receiving, from a server, route-based coverage information for a particular route of travel, wherein:
        the route-based coverage information includes, for each location of a plurality of locations along the particular route, a respective coverage indication indicative of a level of wireless coverage of one or more wireless networks at the respective location; and
        the route-based coverage information additionally indicates, for each wireless network of the one or more wireless networks, a likelihood that the respective wireless network is accessible via a relay connection to the respective wireless network; and
    determining a communication schedule for wirelessly communicating with a remote device while traveling along the particular route, wherein determining the communication schedule is based at least in part on:
        an estimated location of the mobile device, and
        the route-based coverage information for the particular route.

11. The method of claim 10, wherein determining the communication schedule comprises:
    determining a plurality of times for wirelessly communicating with the remote device,
    determining a plurality of locations for wirelessly communicating with the remote device,
    determining a wireless network used to wirelessly communicate with the remote device,
    using a relay device to access a wireless network to wirelessly communicate with the remote device,
    using a non-terrestrial network to wirelessly communicate with the remote device, or
    a combination thereof.

12. The method of claim 10, further comprising sending a coverage report, to the server, for each of one or more reporting locations along the particular route, wherein the coverage report includes characteristics of wireless network coverage for each of the one or more reporting locations.

13. The method of claim 12, wherein the characteristics of wireless network coverage for each of the one or more reporting locations comprise:
    an indication of whether there is or is not wireless coverage,
    a measurement of wireless signals from any of the one or more wireless networks,
    a timestamp of the measurement,
    a position at which the measurement was taken, or
    a combination thereof.

14. The method of claim 10, wherein each location of the plurality of locations comprises:
    a road segment along a respective route of travel,
    a fixed point along a respective route of travel, or
    a combination thereof.

15. The method of claim 10, wherein the coverage indication indicative of the level of wireless coverage of the one or more wireless networks comprises:
    an indication of whether there is or is not wireless coverage,
    a degree of wireless coverage,
    a power measurement of wireless signals from a wireless network,
    an identification of one or more wireless networks which either provide or do not provide wireless coverage,
    a time period, or
    a combination thereof.

16. The method of claim 10, further comprising, prior to receiving the route-based coverage information for the particular route, sending a request to the server for the route-based coverage information for the particular route.

17. The method of claim 16, wherein the request includes information regarding the particular route.

18. The method of claim 17, further comprising receiving the information regarding the particular route from another server.

19. The method of claim 10, wherein the likelihood that the respective wireless network is accessible via the relay connection to the respective wireless network includes an indication, for each location of the plurality of locations, a respective relay availability indication indicative of whether relay availability at the respective location is above a threshold.

20. A server comprising:
    a transceiver;
    a memory; and
    one or more processors communicatively coupled with the transceiver and the memory, wherein the one or more processors are configured to:
        obtain wireless network coverage information via the transceiver from a plurality of crowdsourcing devices, the wireless network coverage information indicating characteristics of wireless network coverage at a first plurality of locations, the first plurality of locations comprising locations along a plurality of routes of travel;
        determine a wireless coverage map of an area based on the wireless network coverage information, wherein:
            the wireless coverage map comprises, for each location of a second plurality of locations along one or more routes of travel within the area, a respective wireless coverage indication indicative of a level of wireless coverage of one or more wireless networks at the respective location; and
            the wireless coverage indication additionally indicates, for each wireless network of the one or more wireless networks, a likelihood that the respective wireless network is accessible via a relay connection to the respective wireless network; and
        send route-based coverage information via the transceiver to a mobile device for a particular route of the one or more routes of travel, wherein the route-based coverage information includes the respective wireless coverage indication, from the coverage map, for one or more locations along the particular route.

21. The server of claim 20, wherein the one or more processors are configured to include, in the wireless coverage indication indicative of the level of wireless coverage of the one or more wireless networks:
- an indication of whether there is or is not wireless coverage,
- a degree of wireless coverage,
- a power measurement of wireless signals from a wireless network,
- an identification of one or more wireless networks which either provide or do not provide wireless coverage,
- a time period, or
- a combination thereof.

22. The server of claim 20, wherein the one or more processors are configured to determine the likelihood that the respective wireless network is accessible via a relay connection to the wireless network is from information concerning the presence of relays included in the wireless network coverage information.

23. The server of claim 20, wherein the one or more processors are configured to send the mobile device the route-based coverage information for the particular route responsive to receiving a request from the mobile device for the route-based coverage information.

24. The server of claim 20, wherein, to indicate the likelihood that the respective wireless network is accessible via the relay connection to the respective wireless network, the one or more processors are configured to indicate, for each location of the second plurality of locations, a respective relay availability indicative of whether relay availability at the respective location is above a threshold.

25. A mobile device comprising:
- a transceiver;
- a memory; and
- one or more processors communicatively coupled with the transceiver and the memory, wherein the one or more processors are configured to:
  - receive, via the transceiver from a server, route-based coverage information for a particular route of travel, wherein:
    - the route-based coverage information includes, for each location of a plurality of locations along the particular route, a respective coverage indication indicative of a level of wireless coverage of one or more wireless networks at the respective location; and
    - the route-based coverage information additionally indicates, for each wireless network of the one or more wireless networks, a likelihood that the respective wireless network is accessible via a relay connection to the respective wireless network; and
  - determine a communication schedule for wirelessly communicating with a remote device while traveling along the particular route, wherein determining the communication schedule is based at least in part on:
    - an estimated location of the mobile device, and
    - the route-based coverage information for the particular route.

26. The mobile device of claim 25, wherein, to determine the communication schedule, the one or more processors are configured to:
- determine a plurality of times for wirelessly communicating with the remote device,
- determine a plurality of locations for wirelessly communicating with the remote device,
- determine a wireless network used to wirelessly communicate with the remote device,
- use a relay device to access a wireless network to wirelessly communicate with the remote device,
- use a non-terrestrial network to wirelessly communicate with the remote device, or
- a combination thereof.

27. The mobile device of claim 25, wherein the one or more processors are further configured to send a coverage report, to the server, for each of one or more reporting locations along the particular route, wherein the coverage report includes characteristics of wireless network coverage for each of the one or more reporting locations.

28. The mobile device of claim 25, wherein, to receive the coverage indication indicative of the level of wireless coverage of the one or more wireless networks, the one or more processors are configured to receive:
- an indication of whether there is or is not wireless coverage,
- a degree of wireless coverage,
- a power measurement of wireless signals from a wireless network,
- an identification of one or more wireless networks which either provide or do not provide wireless coverage,
- a time period, or
- a combination thereof.

29. The mobile device of claim 25, wherein the one or more processors are further configured to, prior to receiving the route-based coverage information for the particular route, send a request to the server for the route-based coverage information for the particular route.

30. The mobile device of claim 25, wherein, to indicate the likelihood that the respective wireless network is accessible via the relay connection to the respective wireless network, the one or more processors are configured to indicate for each location of the plurality of locations, a respective relay availability indicative of whether relay availability at the respective location is above a threshold.

* * * * *